(12) United States Patent
Yamane et al.

(10) Patent No.: US 12,600,109 B2
(45) Date of Patent: Apr. 14, 2026

(54) CARBON FIBER-REINFORCED COMPOSITE MATERIAL

(71) Applicant: TORAY INDUSTRIES, INC., Tokyo (JP)

(72) Inventors: Takuya Yamane, Iyo-gun (JP); Takashi Ochi, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 213 days.

(21) Appl. No.: 18/580,842

(22) PCT Filed: Jul. 25, 2022

(86) PCT No.: PCT/JP2022/028583
§ 371 (c)(1),
(2) Date: Jan. 19, 2024

(87) PCT Pub. No.: WO2023/008357
PCT Pub. Date: Feb. 2, 2023

(65) Prior Publication Data
US 2025/0091315 A1 Mar. 20, 2025

(30) Foreign Application Priority Data

| Jul. 27, 2021 | (JP) | ................................. | 2021-122178 |
| Jul. 27, 2021 | (JP) | ................................. | 2021-122179 |
| Aug. 23, 2021 | (JP) | ................................. | 2021-135413 |

(51) Int. Cl.
| *B32B 5/12* | (2006.01) |
| *B32B 5/02* | (2006.01) |
| *B32B 7/02* | (2019.01) |

(52) U.S. Cl.
CPC ................ *B32B 5/12* (2013.01); *B32B 5/024* (2013.01); *B32B 7/02* (2013.01);
(Continued)

(58) Field of Classification Search
CPC .. B32B 5/12; B32B 5/024; B32B 7/02; B32B 2260/023; B32B 2260/046;
(Continued)

(56) References Cited

U.S. PATENT DOCUMENTS

| 5,194,111 | A | * | 3/1993 | Meatto | ................... | B29C 70/20 |
| | | | | | | 428/162 |
| 2015/0368857 | A1 | | 12/2015 | Aral et al. | | |
| 2018/0100043 | A1 | * | 4/2018 | Takashima | .............. | C08J 5/042 |

FOREIGN PATENT DOCUMENTS

| WO | WO 2008/018421 A1 | 2/2008 |
| WO | WO 2011/027160 A1 | 3/2011 |
| WO | WO 2013/186389 A1 | 12/2013 |

OTHER PUBLICATIONS

Greegor et al., "Finite Element Simulation and Experimental Analysis of Edge Glow for a Generic, 16-Ply Carbon Fiber Reinforced Plastic Composite Laminate," Final ICOLSE15 Paper, May 29, 2015, 9 pages total.

* cited by examiner

*Primary Examiner* — Brian Handville
(74) *Attorney, Agent, or Firm* — Birch, Stewart, Kolasch & Birch, LLP

(57) ABSTRACT

[Problem] A problem to be addressed by the present invention is to provide a CFRP with a low risk of edge glow by virtue of controlling the structure of the CFRP and without relying on expensive electroconductive particles. In other words, provided is a CFRP such that the risk of edge glow is greatly decreased, even in a case where electroconductive particles are used in an amount equal to or smaller than in a conventional technology. Further provided is a CFRP such that the risk of edge glow is greatly decreased without using electroconductive particles.
[Solution] A carbon-fiber-reinforced composite material including carbon fiber sheets containing unidirectionally arranged carbon fibers, laminated multidirectionally one on another, and impregnated with a matrix resin, which is cured; wherein, assuming that a region in which the carbon fibers have the same angle of fiber orientation consecutively in the thickness direction is defined as a Layer, and that, when the Layer is composed of a plurality of regions having a given thickness, and having different carbon fiber volume content factors (Vcf), each of the regions having a given thickness is defined as a Sublayer, the carbon fiber sheet contains a specific Layer that satisfies (1) to (3), and the thickness of a resin portion between the specific Layer and at least one Layer adjacent to the specific Layer is 5 μm or less; (1) the average Vcf of the Layer (hereinafter referred to (Continued)

as the Layer average Vcf) is 50% or more, (2) as both outermost parts of the Layer, Sublayers each having a Vcf the ratio of which to the Layer average Vcf is 0.5 or more (hereinafter, such a Sublayer is referred to as a high-Vcf Sublayer) are disposed, wherein each average Vcf is higher than the Layer average Vcf, and (3) between the high-Vcf Sublayers as both outermost parts of the Layer, a Sublayer having a Vcf the ratio of which to the Layer average Vcf is less than 0.5 (hereinafter, such a Sublayer is referred to as a low-Vcf Sublayer) exists.

17 Claims, 22 Drawing Sheets

(52) U.S. Cl.
CPC ...  *B32B 2260/023* (2013.01); *B32B 2260/046* (2013.01); *B32B 2262/101* (2013.01); *B32B 2262/106* (2013.01); *B32B 2264/0264*

(2013.01); *B32B 2264/108* (2013.01); *B32B 2307/202* (2013.01); *B32B 2307/206* (2013.01); *B32B 2307/724* (2013.01); *B32B 2307/7376* (2023.05)

(58) Field of Classification Search
CPC ........ B32B 2262/101; B32B 2262/106; B32B 2264/0264; B32B 2264/108; B32B 2307/202; B32B 2307/206; B32B 2307/724; B32B 2307/7376; B32B 2250/20; B32B 2605/18; B32B 5/26; B29C 70/08; B29C 70/202; B29K 2105/08
See application file for complete search history.

3000

50µm

ELECTROCONDUCTIVITY IN THICKNESS DIRECTION (S/m)

ELECTROCONDUCTIVITY IN THICKNESS DIRECTION (S/m)

CARBON FIBER-REINFORCED COMPOSITE MATERIAL

TECHNICAL FIELD

The present invention relates to a carbon-fiber-reinforced composite material having excellent lightning resistance, and suitable for induction welding.

BACKGROUND ART

A fiber-reinforced composite material (hereinafter referred to as FRP for short in some cases) is lightweight, nonetheless excels in mechanical characteristics such as strength and stiffness, in heat resistance, and in corrosion resistance, and thus, has been used in many fields, such as aerospace, automobiles, railroad vehicles, ships, and sports goods. In the applications being required high mechanical characteristics, a reinforcing fiber to be used is a carbon fiber (hereinafter referred to as CF for short in some cases) having excellent specific strength and inelastic modulus, and a matrix resin to be used is often an epoxy resin having excellent adhesiveness to CF, heat resistance, elastic modulus, small cure shrinkage. The ratio of a carbon-fiber-reinforced composite material (hereinafter referred to as CFRP for short in some cases) used in a structural member of an aircraft has been increasing in recent years, and also in the future, the ratio of use is expected to increase. In recent years, expectations for high-rate production and fastenerless joining have been increasing the number of cases in which a thermoplastic resin is used as a matrix resin. Examples of the CFRP include: a laminate of CF sheets in which CFs are paralleled unidirectionally (UD); a laminate of CF fabrics in which CFs are arranged multidirectionally; a laminate of sheets in which CFs are randomly disposed; and the like. In a case where the mechanical characteristics of a CFRP is prioritized, a UD CF sheet tends to be used. In a case where a CFRP having a complicated shape is produced, a CF fabric tends to be used. In the applications of structural materials for aircrafts, mechanical characteristics are prioritized, and thus, a laminate having UD CF sheets multidirectionally laminated therein is used widely.

CF is an electrical conductor, and a matrix resin is generally an insulator in many cases. Because CF itself provides an electroconductive path, a CFRP has relatively high electroconductivity in the fiber-axis direction (hereinafter referred to as the fiber direction for short). On the other hand, in the direction perpendicular to the fiber axis of a CFRP (hereinafter referred to as the perpendicular direction), the contact between the CFs forms an electroconductive path, and thus, the electroconductivity is generally as low as approximately $1/1,000$ of the electroconductivity in the fiber direction. In this regard, even the electroconductivity in the fiber direction is generally as low as approximately $1/1,000$ of the electroconductivity of a metal such as aluminium. In this manner, a CFRP has poorer electroconductivity than a metal material, and has anisotropy in the electroconductivity in the direction perpendicular to the fiber direction. Accordingly, a CFRP having a given level of electric current flowing thereinto has a higher voltage applied thereto than a metal material. Furthermore, in a CFRP composed of a plurality of different CF sheets having different angles of fiber orientation, the electric current distribution is very complicated.

Because a CFRP has such complicated electrical characteristics, a CFRP used in an aircraft causes apprehension about damage due to lightning. To disperse lightning current in a CFRP as in a metal material is difficult, and thus, a CFRP is prone to cause a problem such as the generation of damage due to the local concentration of lightning current and the generation of sparks due to the application of a high voltage. Because of this, an aircraft with a CFRP has a lightning-resistant system built up, for example, by attaching a metal mesh, or covering a potentially spark-generating place with a sealant, to secure safety. However, such a lightning-resistant system has problems of increased weight and increased cost. To reduce a lightning-resistant system, and further enhance safety against lightning, the electrical characteristics of a CFRP itself need to be enhanced.

One form of sparking around a fuel tank is what is called edge glow. This refers to a luminous phenomenon (glow) on the side face (edge) of an end of a member, and is being studied to elucidate the mechanism of the occurrence. Non-Patent Literature 1 compares an electric potential analysis of a CFRP and the experimental results of the generation of an edge glow, and discusses the mechanism in detail. FIG. 8 in Non-Patent Literature 1 shows that a CFRP formed by laminating CF sheets having various angles of fiber orientation has a particularly large electric potential difference among the CF sheets having different angles of fiber orientation. Furthermore, according to FIG. 18 in Non-Patent Literature 1, a place where the generation of an edge glow was identified by an experiment was a place where the electric potential difference among the CF sheets having different angles of fiber orientation was large. Accordingly, decreasing the electric potential difference among the CF sheets having different angles of fiber orientation is considered to be effective in inhibiting the edge glow.

It is commonly considered that, to decrease the electric potential difference among the CF sheets having different angles of fiber orientation for the purpose of inhibiting edge glow, it is effective to enhance the electroconductivity of the CFRP in the thickness direction. Accordingly, many material designs for enhancing the electroconductivity of a CFRP in the thickness direction have been proposed. Among these, a technique of disposing electroconductive particles between CF sheets having different angles of fiber orientation has a large effect for enhancing the electroconductivity of the CFRP in the thickness direction, as shown in Patent Literature 1 to 3.

Patent Literature 1 discloses a technology of disposing carbon particles between CF sheets having different angles of fiber orientation. Patent Literature 2 discloses a technology of disposing carbon particles between CF sheets having different angles of fiber orientation. The Examples in the Literature demonstrate that, as the amount of carbon particles is increased, the volume-inherent resistance value of the CFRP in the thickness direction is decreased, and the electroconductivity is enhanced. Patent Literature 3 provides a technology of disposing potato-shaped graphite between CF sheets having different angles of fiber orientation. According to the Examples in the Literature, increasing the amount of the potato-shaped graphite enhances the electroconductivity of the CFRP in the thickness direction.

CITATION LIST

Patent Literature

Patent Literature 1: WO2008/018421
Patent Literature 2: WO2011/027160
Patent Literature 3: WO2013/186389

Non-Patent Literature

Non-Patent Literature 1: R. B. Greegor et al., "Finite Element Simulation and Experimental Analysis of Edge Glow for a Generic, 16-Ply Carbon Fiber Reinforced Plastic Composite Laminate", ICOLSE 15 Paper, 2015

SUMMARY OF INVENTION

Technical Problem

However, the requirements for the electroconductivity necessary to inhibit edge glow are high, and the electroconductivity needs to be enhanced greatly. In Patent Literature 1, the volume-inherent resistance value of a CFRP in the thickness direction, as shown in the Examples, was $2.0 \times 10^3$ $\Omega$cm or more (the electroconductivity was 0.05 S/m or less). That is, a sufficient electroconductivity was not obtained. Patent Literature 2 and 3 shows that, to enhance the electroconductivity, it is effective to increase the amount of electroconductive particles to be disposed between CF sheets, but the requirements for the electroconductivity necessary to inhibit edge glow are high, thus making it necessary that a large amount of electroconductive particles is added. In addition, the electroconductive particles used in Patent Literature 1 to 3 are generally expensive, and thus, the adding amount is preferably decreased. As above-mentioned, decreasing the adding amount of electroconductive particles and lowering the risk of edge glow by enhancing the electroconductivity are antinomic.

A problem to be solved by the present invention is to provide a CFRP such that the risk of edge glow is greatly decreased by controlling the structure of the CFRP, even in a case where electroconductive particles are used in an amount equal to or smaller than in a conventional technology. Furthermore, it is possible to provide a CFRP such that the risk of edge glow is greatly decreased without using electroconductive particles.

Solution to Problem

A first means for solving the problems to be solved by the present invention is a carbon-fiber-reinforced composite material including carbon fiber sheets containing unidirectionally arranged carbon fibers, laminated multidirectionally one on another, and impregnated with a matrix resin, which is cured;

wherein, assuming that a region in which the carbon fibers have the same angle of fiber orientation consecutively in the thickness direction is defined as a Layer, and that, when the Layer is composed of a plurality of regions having a given thickness, and having different carbon fiber volume content factors (Vcfs), each of the regions having a given thickness is defined as a Sublayer, the carbon fiber sheet contains a Layer that satisfies (1) to (3) (such a Layer is referred to as a "specific Layer"), and the thickness of a resin portion between the specific Layer and at least one Layer adjacent to the specific Layer is 5 μm or less;

(1) the average Vcf of the Layer (hereinafter referred to as the Layer average Vcf) is 50% or more, (2) as both outermost parts of the Layer, Sublayers each having a Vcf the ratio of which to the Layer average Vcf is 0.5 or more (hereinafter, such a Sublayer is referred to as a high-Vcf Sublayer) are disposed, wherein each average Vcf is higher than the Layer average Vcf, and (3) between the high-Vcf Sublayers as both outermost parts of the Layer, a Sublayer having a Vcf the ratio of which to the Layer average Vcf is less than 0.5 (hereinafter, such a Sublayer is referred to as a low-Vcf Sublayer) exists.

A second means for solving the problems to be solved by the present invention is a carbon-fiber-reinforced composite material including carbon fiber sheets containing unidirectionally arranged carbon fibers, laminated multidirectionally one on another, and impregnated with a matrix resin, which is cured;

wherein, assuming that a region in which the carbon fibers have the same angle of fiber orientation consecutively in the thickness direction is defined as a Layer, and that, when the Layer is composed of a plurality of regions having a given thickness, and having different carbon fiber volume content factors (Vcfs), each of the regions having a given thickness is defined as a Sublayer, the carbon fiber sheet contains a Layer that satisfies (1) to (3) (such a Layer is referred to as a "specific Layer"), and a resin portion exists between the specific Layer and a Layer adjacent to the specific Layer, the resin portion containing electroconductive particles;

(1) the average Vcf of the Layer (hereinafter referred to as the Layer average Vcf) is 50% or more, (2) as both outermost parts of the Layer, Sublayers each having a Vcf the ratio of which to the Layer average Vcf is 0.5 or more (hereinafter, such a Sublayer is referred to as a high-Vcf Sublayer) are disposed, wherein each average Vcf is higher than the Layer average Vcf, and (3) between the high-Vcf Sublayers as both outermost parts of the Layer, a Sublayer having a Vcf the ratio of which to the Layer average Vcf is less than 0.5 (hereinafter, such a Sublayer is referred to as a low-Vcf Sublayer) exists.

Advantageous Effects of Invention

A CFRP according to the present invention affords a sufficient effect for inhibiting edge glow, even in a case where the amount of expensive electroconductive particles used is reduced. Furthermore, the CFRP affords a further effect for inhibiting edge glow than a conventional technology in which electroconductive particles are simply disposed between CF sheets having different angles of fiber orientation. Using such a CFRP for an aircraft enables a lightning-resistant system to be more efficient as a whole. Furthermore, the present invention provides an advantage in that induction heating temperature can be raised in induction welding to be used for a CFRP of which the matrix resin is mainly composed of a thermoplastic resin.

DESCRIPTION OF EMBODIMENTS

Below, the present invention will be described in further detail.

<Carbon Fiber Sheet and CFRP>

CF is usually used as a "tow" obtained by assembling approximately 1,000 to 1,000,000 single fibers in the form of tape. A carbon fiber sheet (hereinafter referred to as a CF sheet) to be used in the present invention has CFs unidirectionally paralleled, and preferably can be obtained by arranging the tows. A CF sheet having CFs arranged unidirectionally (UD) in the longitudinal direction in such a manner or a carbon-fiber-reinforced resin sheet obtained by impregnating the CF sheet with a matrix resin is referred to as a UD material. One form of a UD material is, for example, a Non Crimp Fabric (NCF) formed by sewing UD-arranged CF sheets together using stitching threads.

A CFRP according to the present invention can be obtained by molding a carbon-fiber-reinforced resin sheet obtained by impregnating the above-described CF sheets with a matrix resin. The CF sheets laminated are impregnated with the matrix resin, which is cured. An intermediate base material (prepreg) produced by impregnating CF sheets with a matrix resin may be laminated and molded. Alternatively, a resin infusion method may be adopted, in which method a resin is injected into a laminate formed by layering CF sheets not impregnated with a resin, and the laminate is formed. Here, in a CFRP according to the present invention, UD materials are laminated multidirectionally. Being "laminated multidirectionally" refers to a state in which a plurality of UD materials are layered at different angles of fiber orientation. That is, a CFRP according to the present invention has CFs oriented in different two directions or three or more directions. Taking into consideration the use for a structural member for aircrafts, sheets of unidirectional (UD) prepreg are preferably laminated multidirectionally, and molded. Obviously, a laminate formed by laminating UD materials multidirectionally may be combined with a base material other than a UD material.

As below-described, the present invention is characterized by having a structure in which a "specific Layer" has high-Vcf Sublayers as both outermost parts thereof, and has a low-Vcf Sublayer between the high-Vcf Sublayers. As below-described, the present invention is composed of two inventions characterized by the respective designs of the inter-Layer resin layer. In this regard, both outermost parts are understood as the outermost parts in the thickness direction, since the Layer is in layered form.

<Outline of One Embodiment of First Invention of Present Invention>

Figure 1:
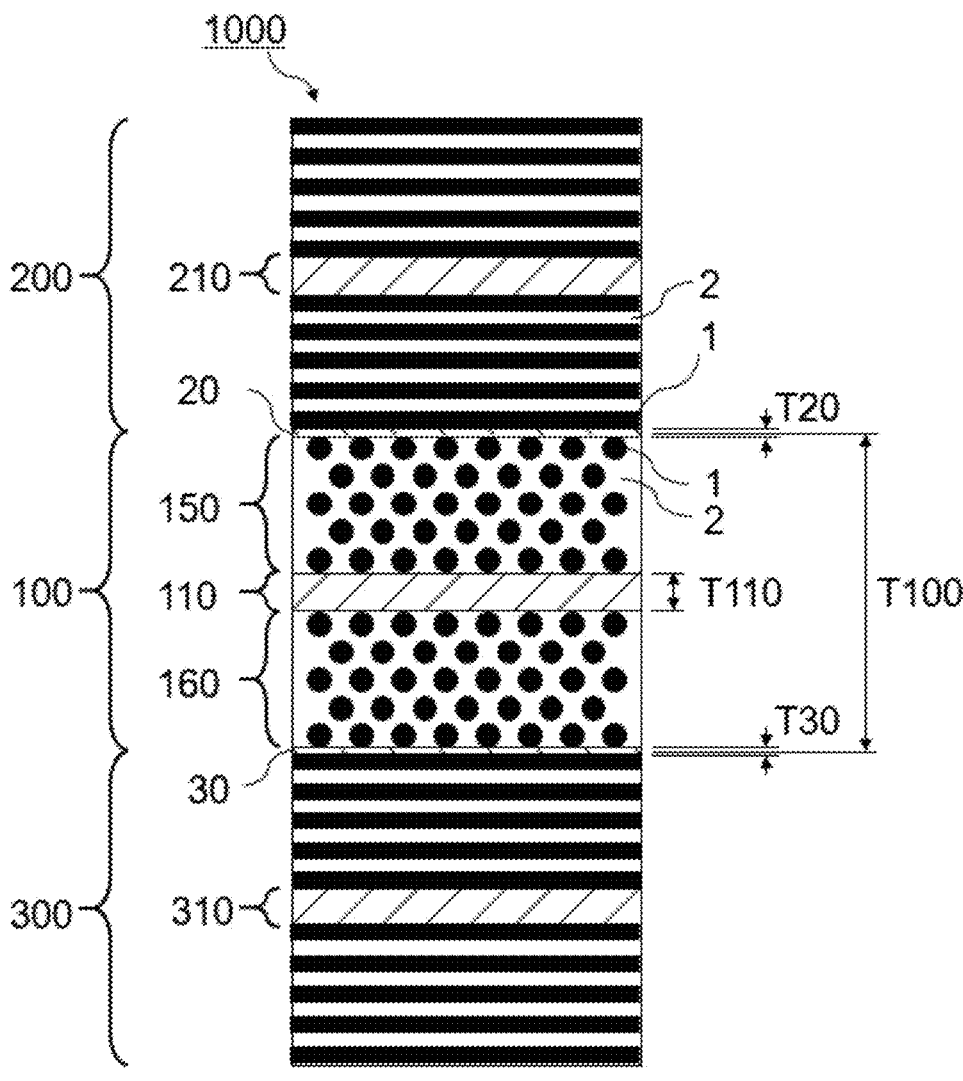
FIG. 1 is a cross-sectional view illustrating one embodiment of a CFRP according to a first invention.

A CFRP 1000 illustrated in FIG. 1 includes a plurality of CFs 1 arranged unidirectionally and a matrix resin 2 with which a CF sheet is impregnated.

Here, the present invention is not limited to the embodiments described below. In addition, without limitation to the present embodiment, a region containing a region in which the CFs in the CF sheets have the same angle of fiber orientation consecutively in the thickness direction is defined as a Layer in the present invention. In this regard, the Layer may contain, as the below-described "Sublayer", a region containing no fiber or a region containing a fiber other than a CF.

Since the CF sheets having unidirectionally arranged CFs are laminated multidirectionally, a CFRP according to the present invention inevitably has a plurality of Layers. In addition, when the Layer is composed of a plurality of regions having a given thickness, and having different Vcfs, each of the regions having a given thickness is defined as a Sublayer.

The present invention contains at least one Layer (specific Layer) that is composed of a plurality of Sublayers, and satisfies the above-described conditions (1) to (3). In this regard, a Layer that does not satisfy the conditions for the "specific Layer" is referred to as an ordinary Layer in some cases. Taking a Layer 100 for example, the above-described conditions (1) to (3) will be described below. In a CFRP 1000, a Layer 200 and a Layer 300 that have an angle of fiber orientation different from the Layer 100 are adjacent to the upper side and lower side of the Layer 100 respectively (hereinafter, each referred to as an adjacent Layer in some cases). Between the Layer 100 and the Layer 200 and between the Layer 100 and the Layer 300, inter-Layer resin layers 20 and 30 exist respectively. The thicknesses of the inter-Layer resin layers are referred to as T20 and T30 respectively. However, in another embodiment of the present invention, the inter-Layer resin layers 20 and 30 may be inexistent. From the viewpoint of enhancing the electroconductivity, the average Vcf of the Layer 100 is 50% or more as in the condition (1). The average Vcf of the Layer is preferably 60% or more, and on the other hand, the upper limit is preferably 90%, more preferably 80%, to inhibit the generation of a void.

The Layer 100 contains a Sublayer having a Vcf the ratio of which to the average Vcf of the whole Layer is 0.5 or more. This Sublayer is defined as a high-Vcf Sublayer, as in the condition (2). Furthermore, as in the condition (2), the Layer 100 has high-Vcf Sublayers disposed as both outermost parts thereof. The average Vcf of the Sublayers is higher than the average Vcf of the Layer. A high-Vcf Sublayer may exist at a position other than both outermost parts of the specific Layer 100. From the viewpoint of electroconductivity, the high-Vcf Sublayers disposed as both outermost parts each preferably have the highest or second highest average Vcf in the high-Vcf Sublayers existing in the specific Layer 100. In this regard, in a case where a high-Vcf Sublayer exists at a position other than both outermost parts, the Vcf of such a high-Vcf Sublayer is also preferably 69% or more. In addition, the average Vcf of all the high-Vcf Sublayers including the high-Vcf Sublayers as both outermost parts is more preferably 71% or more, still more preferably 73% or more.

On the other hand, the Layer 100 contains a Sublayer that is disposed between the high-Vcf Sublayers existing as both outermost parts of the Layer, and has a Vcf the ratio of which to the average Vcf of the whole Layer 100 is less than 0.5. The former Sublayer is defined as a low-Vcf Sublayer, as in the condition (3). The low-Vcf Sublayer is preferably an insulating layer containing no CF. To make the low-Vcf Sublayer an insulating layer, it is also effective to insert a glass fiber woven fabric or the like as a spacer, as below-described.

That is, a Layer that satisfies the conditions (1) to (3) as the Layer 100 does is referred to as a "specific Layer" in the present invention. Additionally in the present invention, to enhance the electroconductivity, at least one of the thicknesses of the resin portions (the thicknesses T20 and T30 of the respective inter-Layer resin layers in the present embodiment) that are each between the "specific Layer" and each of the adjacent Layers is 5 μm or less, more preferably 2 μm or less. In this regard, both of the resin thicknesses (T20 and T30 in the present embodiment) are each more preferably 5 μm or less, still more preferably 2 μm or less. The thickness of the inter-Layer resin layer may be 0 μm. As illustrated in FIG. 1, the Layers 200 and 300 are "specific Layers" in the same manner as the Layer 100 in the present embodiment, but may each be an ordinary Layer.

To enhance the electroconductivity of the CFRP, it is effective to enhance the Vcf. However, in a case where the average Vcf of a Layer having the Vcf uniformly is increased, the CF sheet is not sufficiently impregnated with a matrix resin, raising a problem in that a void tends to be generated in the CFRP. On the other hand, the Layer 100 that is a "specific Layer" has a low-Vcf region, and thus, makes it possible to inhibit the average Vcf of the Layer from becoming excessively high, and to locally increase the Vcf only near the adjacent Layer (200 or 300). In a case where the Vcf near the adjacent Layer is high, the CFs in the Layer 100 and the CFs in the adjacent Layer are more easily brought into contact with each other, enabling the electroconductivity between the Layers to be greatly enhanced. To locally increase the above-described Vcf near the adjacent Layer without excessively increasing the average Vcf of the Layer, the average Vcf of the low-Vcf Sublayer is preferably 20% or less, still more preferably 10% or less. To further enhance the electroconductivity to and from the adjacent Layer, the ratio of the thickness (T110 in the present embodiment) of the low-Vcf Sublayer contained in the Layer 100 to the thickness (T100 in the present embodiment) of the Layer 100 is preferably 5% or more, still more preferably 10% or more. Here, the thickness T100 of the Layer 100 is defined as the distance from the thickness-direction midpoint of the inter-Layer resin layer 30 on the lower side of the Layer 100 to the thickness-direction midpoint of the inter-Layer resin layer 20 on the upper side of the Layer 100. The "specific Layer" having a thickness of 350 μm or more allows an increase in the ratio of the "specific Layer" in the CFRP in the thickness direction, and is preferable from the viewpoint of the electrical characteristics of the CFRP. The thickness of the "specific Layer" is more preferably 400 μm or more, still more preferably 450 μm or more. The thickness of the "specific Layer" is not particularly limited to any upper limit, and is commonly 1000 μm or less. The above-described ratio of the thickness of the low-Vcf Sublayer, if too large, causes the mechanical characteristics to be ununiform depending on the position, and thus, is preferably 30% or less. In addition, it is preferable, from the viewpoint of stably forming the low-Vcf Layer, that the low-Vcf Layer contains an air-permeable sheet-like base material. The air-permeable sheet-like base material is a sheet having three-dimensionally consecutive pores, and capable of forming consecutive air-permeable paths. Examples include; a woven or knitted fabric and a nonwoven fabric that are each composed of glass fiber or organic fiber; and the like. Among these, a glass fiber woven fabric is preferable from the viewpoints of heat resistance and general-purpose properties. In addition, a woven or knitted fabric and a nonwoven fabric that are each composed of a polymer fiber are preferable from the viewpoint of enhancing the toughness of the resulting CFRP. A woven fabric is preferable from the viewpoint of dimensional stability, and a nonwoven fabric is preferable from the viewpoints of thinness and cost. Among these, a glass fiber woven fabric is well-balanced for use for a CFRP, and thus, is most preferable.

In addition, to further enhance the electroconductivity to and from the adjacent Layer, the average Vcf of the high-Vcf Sublayer in the "specific Layer" is preferably 55% or more, more preferably 65% or more. The average Vcf is still more preferably 71% or more, most preferably 73% or more. In addition, from the viewpoint of enhancing the electroconductivity to and from the adjacent Layer, it is preferable that the Vcf of each of the high-Vcf Sublayers as both outermost parts is 69% or more. On the other hand, the upper limit of the average Vcf of the high-Vcf Sublayer is preferably 90%, more preferably 80% or less.

<Details of One Embodiment of First Invention of Present Invention>

Figure 2:
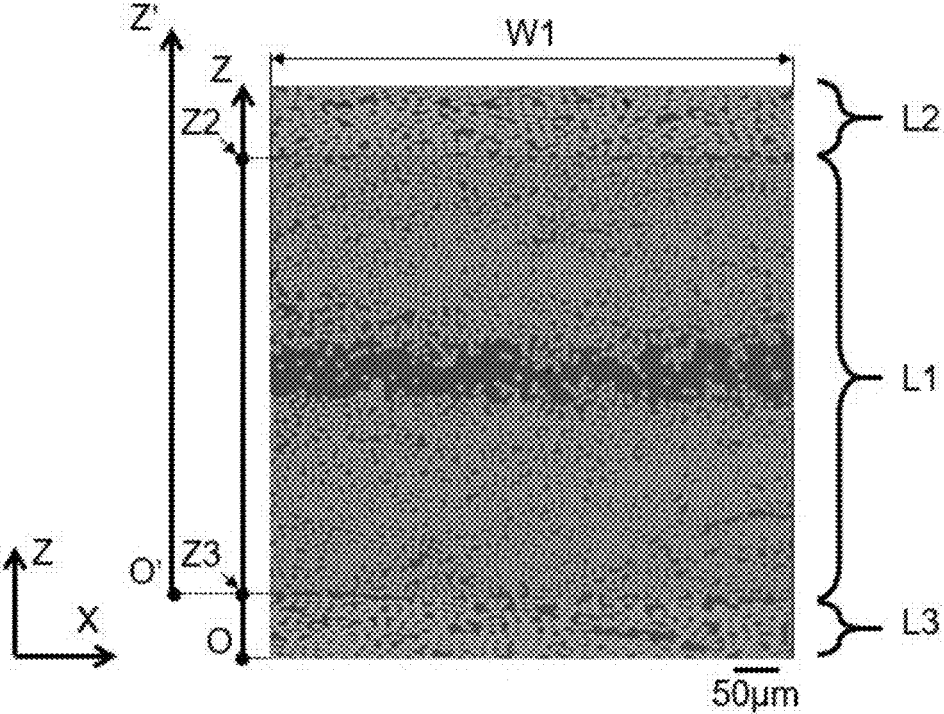
FIG. 2 is a cross-sectional photograph of one embodiment of a CFRP according to the first invention.

A CFRP according to the present invention will be described in further detail with reference to FIG. 2. A CFRP illustrated in FIG. 2 is one form of a CFRP according to the present invention, and contains: a Layer L1 that is a "specific Layer"; and one portion of each of ordinary Layers L2 and L3. L2 and L3 are different from L1 in the angle of fiber orientation of the CFs. As above-described, the angles of orientation of the CFs in a Layer are the same in the present invention. However, considering that the CFs flow owing to an influence during molding in some cases, the present invention does not require that the angles of orientation are completely the same. In the present invention, to which Layer each CF belongs can be determined from the difference in the shape between the cross sections of the CFs. Usually, the cross-sectional shape of a CF is observed in the form of an ellipse. A region in which the CFs are generally identical in the length of the long axis of the ellipse, and in which the CFs are consecutive in the thickness direction is judged to be one Layer. In addition, a region that may be regarded as one Layer is such that, at a stage when prepreg has been laminated, the CFs consecutive in the thickness direction are understood to have the same angle of orientation. As illustrated in the drawing, the rightward direction on the page is the positive X-axis direction, the upward direction on the page is the positive Z-axis direction, and the origin O of the Z-axis is set at the lower end of the cross-sectional photograph.

Figure 3:
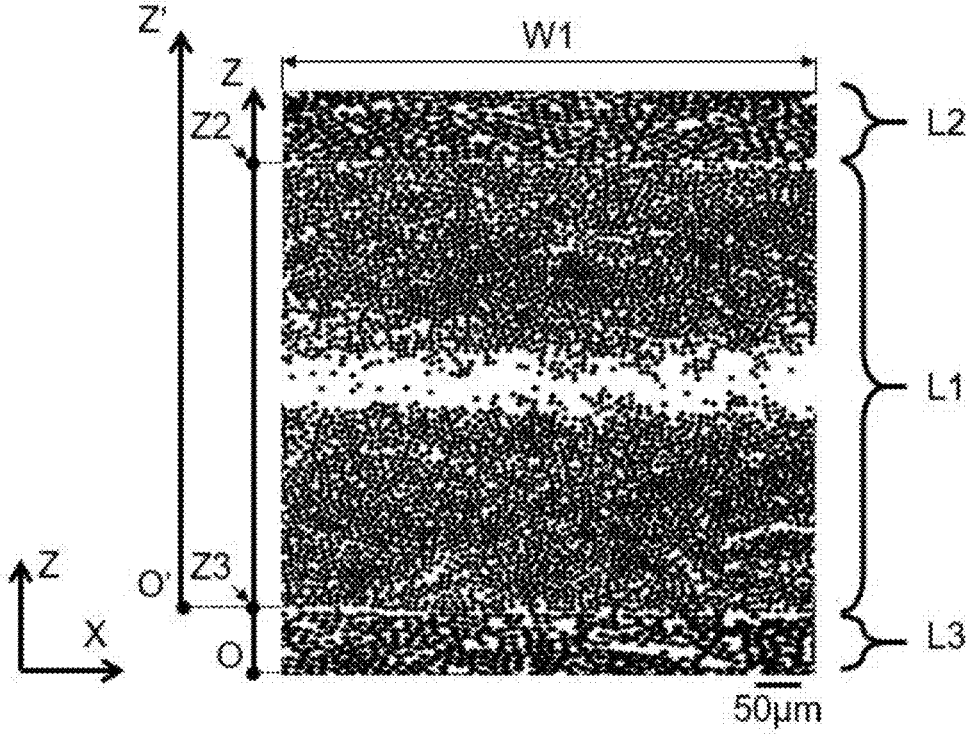
FIG. 3 is an image obtained by binarizing FIG. 2.
Figure 4:
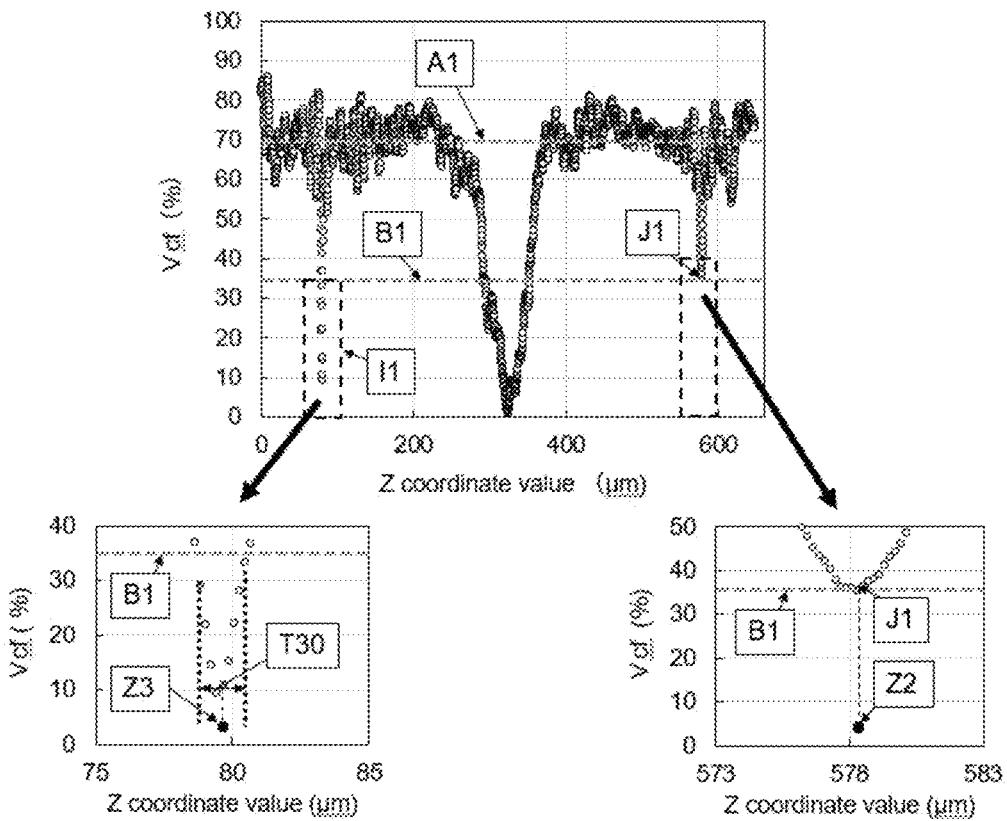
FIG. 4 presents a graph of the distribution of the Vcf in the Z direction in the cross section in FIG. 3, and presents the enlarged parts of the graph of the distribution.

In the present invention, the boundary between the specific Layer L1 and each of the adjacent Layers L2 and L3, the low-Vcf Sublayer, and the high-Vcf Sublayer are judged from the Z-direction Vcf distribution. The Z-direction Vcf distribution can be determined as below-described, and will be described, taking FIG. 2 for example. First, using image analysis software, FIG. 2 is binarized, and CF (black) and a matrix resin (white) are distinguished (FIG. 3). When this is done, the image illustrated in FIG. 2 needs to have a resolution such that the length of one side of 1 pixel is 0.3 μm or less, and to range 500 μm or more in the X-axis direction. Image analysis software that can be used is, for example, ImageJ (developed by Wayne Rasband, National Institutes of Health) or the like. A Vcf can be calculated from the areal ratio of the black portions that denote CFs. A Vcf is calculated, using, as a region of evaluation, a rectangular region having a length (0.2 μm here) equal to 1 pixel in the Z direction and a length (W1) (590 μm here) equal to the whole X-axis in the image in the X direction. In the Z-axis direction from the origin of the Z-axis, a Vcf in the region of evaluation is calculated for every 0.2 μm interval having a length equal to 1 pixel, so that the Z-direction distribution of the Vcf can be obtained. The Z-direction distribution of the Vcf obtained from FIG. 3 is shown in FIG. 4.

Next, to extract only the specific Layer L1, the Z coordinates (Z2 and Z3 in FIG. 3) of the boundaries with the adjacent Layers are determined. First, the median Vcf calculated from the Z-direction distribution of the Vcf shown in FIG. 4. This value corresponds to A1 in FIG. 4, and is the representative value of the Vcfs of the specific Layer L1, Layer L2, and L3 that are contained in the cross-sectional photograph. Here, the average is not adopted as the representative value of the Vcfs, because it is considered that, if the average is adopted, the representative value of the Vcfs tends to vary, depending on the range of the region observed in the Z-direction of the cross-sectional photograph. A value obtained by multiplying the representative value (A1 in FIG. 4) of the Vcfs by 0.5 is regarded as a threshold for defining an inter-Layer resin layer adjoining to the adjacent Layer. This threshold corresponds to B1 in FIG. 4. The portion having a Vcf equal to or lower than the threshold B1 near the boundary with the adjacent Layer is defined as an inter-Layer resin layer. In the upper graph in FIG. 4, only the portion denoted by I1 corresponds to the portion, and I1 is regarded as the inter-Layer resin layer between the Layers L1 and L3. The thickness of the inter-Layer resin layer is defined as the Z-coordinate length of the portion corresponding to the inter-Layer resin layer. In the lower left graph in FIG. 4, T30 corresponds to the thickness of the inter-Layer resin layer. The Z coordinate of the boundary with the adjacent Layer is defined as the median value of the Z coordinate of the portion corresponding to the inter-Layer resin layer. In FIG. 4, Z3 corresponds to the Z coordinate of the boundary between the Layers L1 and L3. On the other hand, near the boundary between the Layers L1 and L2, a portion having a Vcf equal to or lower than the threshold B1 does not exist, hence an inter-Layer resin layer is regarded as being inexistent, and the thickness of the layer is 0. In this case, the Z coordinate of the boundary with the adjacent Layer is defined as the Z coordinate of the point showing the lowest Vcf value near the boundary with the adjacent Layer. In the lower right graph in FIG. 4, Z2 is the Z coordinate of the boundary between the Layers L1 and L2, and this is the Z coordinate of the point J1 showing the lowest Vcf value near the boundary between the Layers L1 and L2. The region of the specific Layer L1 in the Z-direction ranges between Z3 and Z2 that are the Z coordinates of the boundaries with the adjacent Layers.

Figure 5:
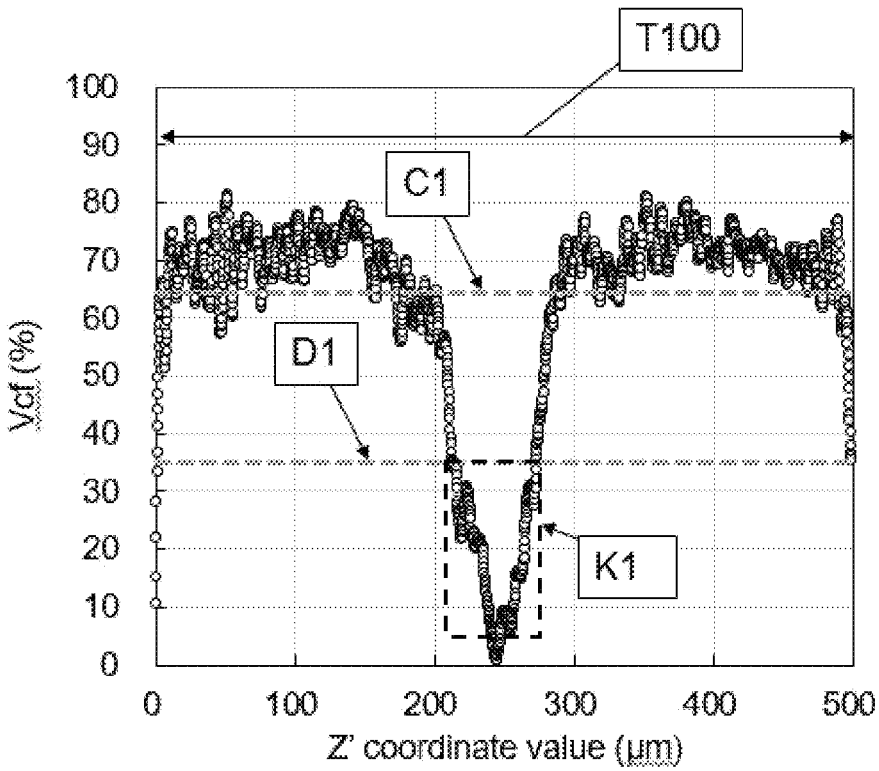
FIG. 5 is a graph of the Z-direction distribution of the Vcf in the Layer L1 in FIG. 3.

Next, attention is focused only on the specific Layer L1. As shown in FIG. 3, the Z' axis parallel with the Z axis is newly defined with Z3 used as the origin O'. FIG. 5 graphs the Z'-direction distribution of the Vcf in the specific Layer L1. The thickness T100 of the specific Layer L1 is a value obtained by subtracting Z3 from Z2, and defined as the largest value of Z' coordinate. The average Vcf of the Layer L1 is defined by the average of the Z'-direction distribution of the Vcf. This value corresponds to C1 in FIG. 5. A value obtained by multiplying C1 by 0.5 is regarded as a threshold for defining the low-Vcf Sublayer. This threshold corresponds to D1 in FIG. 5. Except the inter-Layer resin layers at the upper end and lower end of the Layer, a portion having a Vcf smaller than D1 is defined as a low-Vcf Sublayer. This corresponds to the K1 portion in FIG. 5. The thickness and average Vcf of the low-Vcf Sublayer are defined by the thickness and average Vcf of the portions having a Vcf smaller than D1. Contrarily, portions having a Vcf equal to or larger than D1 are defined as high-Vcf Sublayers. The average Vcf of the high-Vcf Sublayers is defined by the average Vcf of the portions having a Vcf equal to or larger than D1.

The Layer L1 is determined as a "specific Layer" from the following: the average Vcf of the whole Layer is equal to or larger than 50%; high-Vcf Sublayers are disposed on both sides of a low-Vcf Sublayer; and furthermore, the average Vcf of the high-Vcf Sublayers is higher than the average Vcf of the whole Layer.

Considering the mechanical characteristics of a CFRP, the CFRP preferably has a smaller number of void spaces. Literature by L. Liu et al. (*Journal of Composite Structures, Vol.* 73, p. 303-309, 2006) has reported that, as the void ratio of a CFRP exceeds 1.0%, all of the shear strength, bending strength, and tensile strength decrease greatly. In the present invention, the void ratio of a CFRP is 1.0% or less, preferably 0.5% or less, from the viewpoint of mechanical characteristics.

Figure 23:
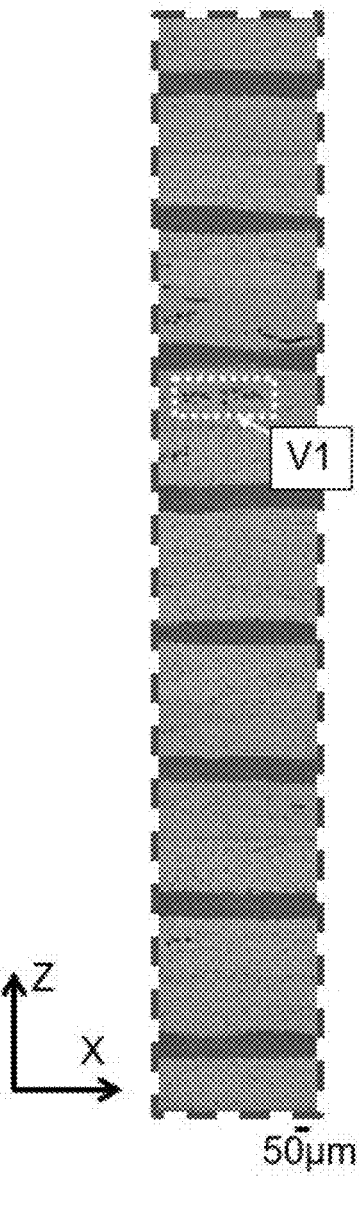
FIG. 23 is a cross-sectional photograph of one embodiment of a CFRP having a void.
Figure 24:
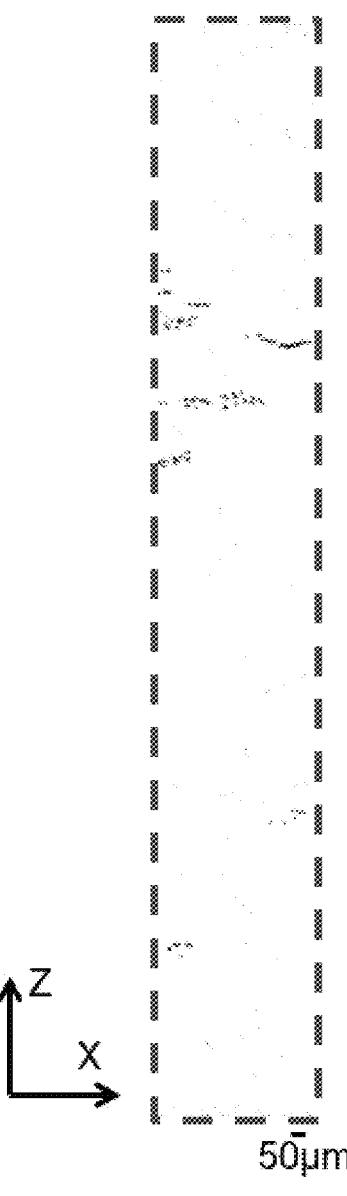
FIG. 24 is an image obtained by binarizing FIG. 23.

In the present invention, the void ratio of the CFRP is calculated from the areal ratio of the void spaces to the region observed in the cross section of the CFRP. Here, it is important that the observed region is a region equal to the whole thickness of the CFRP and equal to or larger than 500 μm in the X-axis direction (FIG. 23). FIG. 23 is one form of a CFRP according to the present invention, and illustrates a region equal to the whole thickness of the CFRP and equal to 590 μm in the X-axis direction. FIG. 23 includes void spaces at a plurality of portions, other than the void V1. Using image analysis software, FIG. 23 is binarized, and void spaces (black) and other regions (white) are distinguished (FIG. 24). In FIG. 24, the areal ratio of the void spaces is defined as the void ratio of the CFRP. The CFRP in FIG. 24 is a CFRP in a preferable aspect because the void ratio is 1.0% or less.

<Effect for Inhibiting Edge Glow>

A higher electroconductivity between the Layers facilitates the inflow and outflow of the electric current between the Layers. In this case, it is easier to utilize a plurality of Layers as electric current paths even when lightning current flows into a CFRP. Accordingly, it is easier to prevent the local concentration of lightning current, and disperse the electric current. Enabling the electric current to be dispersed into a plurality of Layers decreases the electrical resistance between the inflow portion and outflow portion for the lightning current, and decreases the electric potential difference. The electric potential difference between the inflow portion and outflow portion for the electric current, when decreased, overall decreases the electric potential difference caused in the CFRP, and then, decreases the electric potential difference between adjacent Layers. The electric potential difference decreased between the adjacent Layers affords an effect for inhibiting edge glow. To more deeply understand the electric potential difference between the Layers, the way in which the electric current flows in the CFRP will be described below.

As a representative example of the structure of an aircraft, the structure of a multidirectionally laminated CFRP will be discussed, in which two metal bolts are inserted, as illustrated in FIG. 3 in the literature by I. Revel et al. (Lecture Paper, International Conference on Lightning Protection 2016, 2016). A situation contemplated as a situation in which an edge glow tends to occur is as follows: lightning strikes on one of the bolts, causing a lightning current to flow thereinto; the lightning current flows through the structure of a CFRP; and the lightning current flows out through the other of the bolts.

A CFRP has strong anisotropy in electroconductivity. Thus, in each Layer, the electric current tends to flow mainly only in the CF direction. In a Layer in which CFs connect the two bolts directly, the electric current concentratedly flows into the CFs connecting the bolts. The electroconductivity in the fiber direction is relatively high. Thus, in this case, the electrical resistance between the two bolts is low, ant the electric potential difference between the bolts is small. On the other hand, in a Layer in which CFs do not connect two bolts directly, the electric current spreads along CFs connected to the bolts, and then, the electric current needs to flow perpendicularly in the Layer. The electroconductivity in the perpendicular direction is commonly 1,000 times as small as the ratio of the electroconductivity in the fiber direction. Thus, in this case, the electrical resistance between the two bolts is high, and the electric potential difference between the bolts is large.

In the case of a CFRP containing Layers having different angles of fiber orientation, the electric current spreads along the CFs connected to the bolts in each Layer. The electric current spread along the CFs can flow in the direction perpendicular to the CFs in each Layer, but can also flow into an adjacent Layer having a different angle of fiber orientation, and flow utilizing the CFs of the adjacent Layer. In each Layer, the electrical resistance between the bolts is smaller in a case where the current flows over a short distance to an adjacent Layer having a different angle of fiber orientation, and then flows over a long distance in the fiber direction in which the electroconductivity is high in the adjacent Layer than in a case where the current flows over a long distance in the perpendicular direction in which electroconductivity is low. The electric current path is determined so as to minimize the electrical resistance between the bolts. Thus, the CFRP having a plurality of Layers having different angles of fiber orientation has an electric current path, through which path the electric current flows back and forth between the Layers.

In a case where the electric current flows back and forth between the Layers, the electroconductivity between the Layers determines the electric potential difference between the Layers. In a case where the electroconductivity between the Layers is high, the back-and-forth electric current to and from an adjacent Layer is facilitated even if the electric potential difference is not large between the adjacent Layers. In this case, the electrical resistance between the two bolts is decreased, and the electric potential difference therebetween is decreased.

The above-described facts make it possible that, in the case of a CFRP containing a plurality of Layers, enhancing the electroconductivity between adjacent Layers inhibits an increase in the electric potential difference between the two bolts even with the inflow of a large electric current such as lightning current, and decreases a voltage applied to the CFRP, particularly the electric potential difference between the adjacent Layers. This can decrease the risk of generating an edge glow.

<Effect for Enhancing Induction Heating Temperature>

A high electroconductivity between adjacent Layers affords a desirable effect besides inhibiting edge glow. Examples include a high effect for induction welding that is utilized for a CFRP containing a thermoplastic resin as a matrix resin. An induction welding technology is partially used practically for the structure of an aircraft composed of a CFRP. Induction welding is a technology in which the thermoplastic resin of a CFRP is melted by induction heating, and joined by pressing separately. Induction heating means that allowing an AC current to flow in a coil placed outside of a CFRP generates an induced current in the CFRP, thus heating the CFRP with Joule heating due to the induced current. In induction welding, it is desired that the induction heating temperature is increased with a smaller input energy.

To increase the induction heating temperature, it is important to enhance the Joule heating due to the induced current, and thus, it is effective to increase the amount of induced current generated in the CFRP. Literature by X. Xu et al. (*Journal of NDT and E International*, Vol. 94, p. 79-91, 2018) demonstrates, by numerical analysis, that enhancing the electroconductivity between Layers having different angles of fiber orientation increases the amount of induced current generated in a CFRP. That is, a CFRP according to the present invention involves generating a large amount of induced current, and makes it easier to increase the induction heating temperature, and thus, affords a desirable effect for induction welding.

The amount of induced current generated in a CFRP can be compared by eddy current flaw detection. Eddy current flaw detection is generally a test in which a crack or the like in a CFRP is detected through the evaluation of an induced current generated in the CFRP. In eddy current flaw detection, a coil is placed near a CFRP, and from the impedance variation of the coil, a magnetic field generated by the induced current is evaluated. According to Literature by K. Mizukami et al. (*Journal of Polymer Testing*, Vol. 69, p. 320-324, 2018), a magnetic field generated by an induced current is evaluated from variations in the series resistance component of a coil. The literature shows that the larger the variations in the magnetic field, that is, the larger the amount of the induced current, the larger the series resistance component of the coil.

<Another Example of Embodiment of First Invention of Present Invention>

Figure 6:
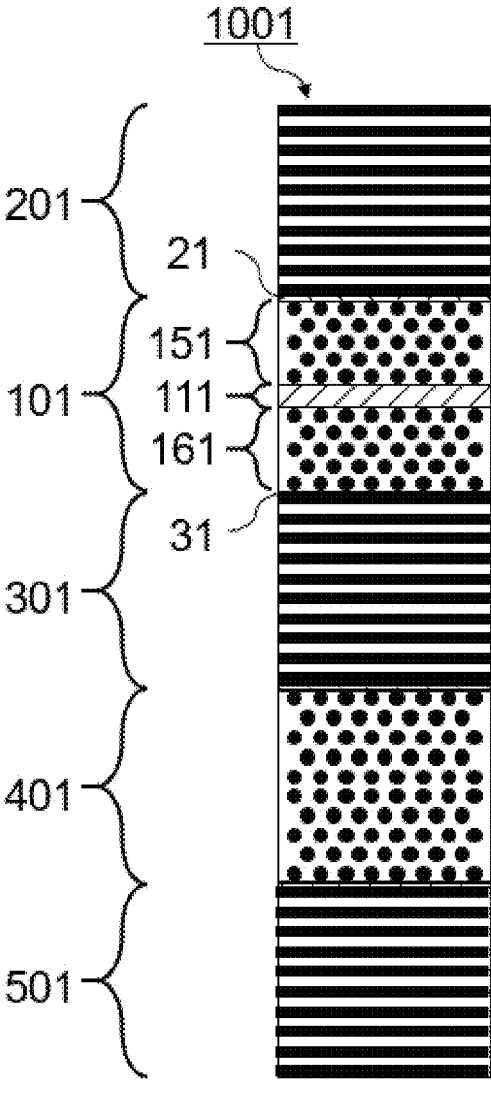
FIG. 6 is a cross-sectional view illustrating another embodiment of a CFRP according to the first invention.

In the present invention, a Layer that satisfies the conditions for the "specific Layer" is preferably disposed as the first or the second in the Layers numbered from the upper face or lower face of a CFRP. In induction welding, this makes it possible, for example, to increase the induced current concentratedly near the surface of a CFRP as a face to be welded, and to perform heating efficiently. In a CFRP 1001 in such a form illustrated in FIG. 6, a specific Layer 101 is disposed in the second place in the Layers numbered from the upper face of the CFRP 1001. When the upper face is a face to be welded, the upper face and its vicinity can be induction-heated efficiently. A Layer other than the specific Layer 101 may be one that satisfies the conditions for the "specific Layer", or may be an ordinary Layer.

In addition, the "specific Layer" is preferably in the form of two or more consecutively laminated layers. Between the "specific Layers", the electroconductivity of the portions adjacent thereto is enhanced greatly, further enhancing the effect for inhibiting edge glow or increasing the induction heating temperature. If only from the viewpoints of inhibiting edge glow and increasing the induction heating temperature, it is also preferable that all the Layers are "specific Layers".

Figure 7:
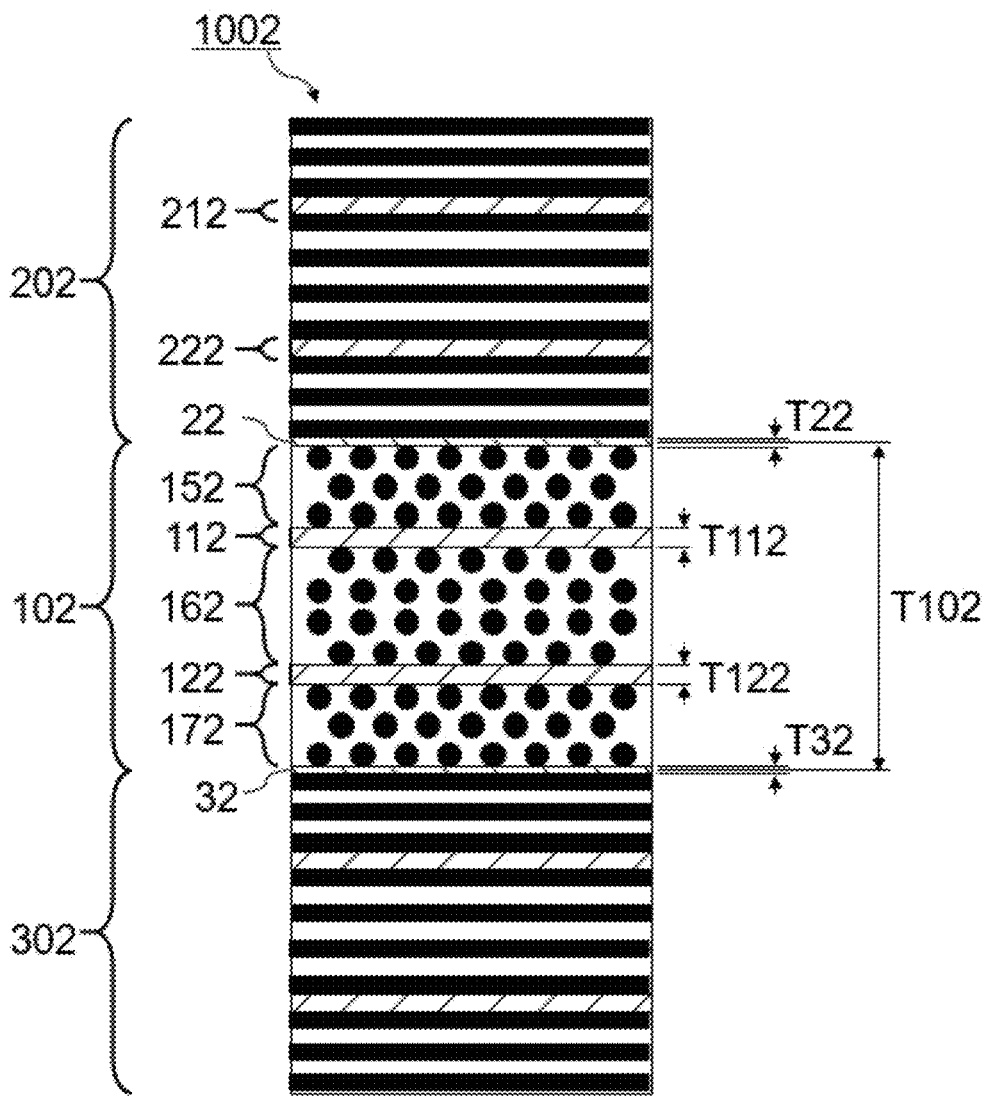
FIG. 7 is a cross-sectional view illustrating another embodiment of a CFRP according to the first invention.

Another embodiment of a CFRP according to the present invention is illustrated in FIG. 7. In a Layer 102 having the same fiber direction, low-Vcf Sublayers 112 and 122 are sandwiched between high-Vcf Sublayers 152, 162, and 172. In such a manner, a CFRP according to the present invention can have high-Vcf Sublayers disposed as both outermost parts of the Layer, even if the Layer has a plurality of low-Vcf Sublayers. In this case, in the Layer 102, the average Vcf of the high-Vcf Sublayers 152 and 172 as both outermost parts is preferably higher than the average Vcf of the high-Vcf Sublayer 162 inside in the thickness direction. In a case where a plurality of low-Vcf Sublayers exist in a "specific Layer" in all the aspects including the present aspect, the characteristics of the low-Vcf Sublayer are defined as the characteristics of all the low-Vcf Sublayers combined in the Layer. With reference to FIG. 7, this means that the thickness of the low-Vcf Sublayer is defined as the sum of the thickness T112 of the low-Vcf Sublayer 112 and the thickness T122 of the low-Vcf Sublayer 122. In addition, the average Vcf of the low-Vcf Sublayer is the average Vcf of the low-Vcf Sublayer 112 and the low-Vcf Sublayer 122 that are combined together.

<Example of Form of Conventional Technology>

Figure 8:
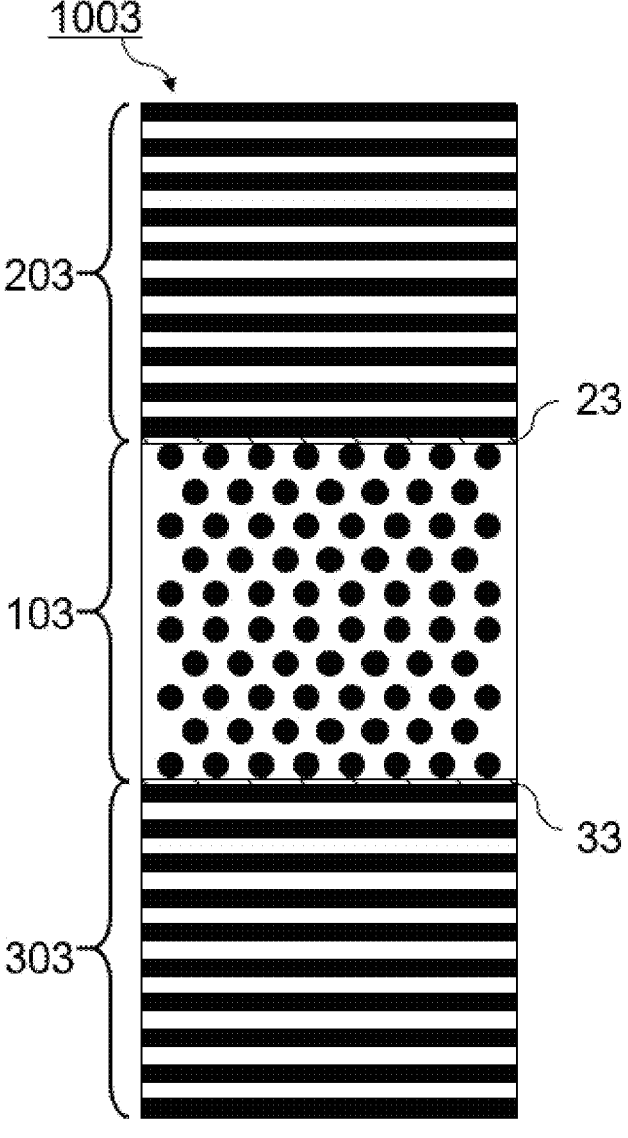
FIG. 8 is a cross-sectional view illustrating one form of a conventional ordinary CFRP.

FIG. 8 is a cross-sectional view illustrating one form of a conventional ordinary (non-interlaminar-reinforcement) CFRP. Among the Layers having the same angle of fiber orientation, the Vcf is substantially uniform, independent of the position. In addition, the Layer does not have a structure in which high-Vcf Sublayers are disposed as both outermost layers of the Layer, between which layers a low-Vcf Sublayer exists. If the total thickness of the Layers and the average Vcf of the Layers are each the same between the present invention illustrated in FIGS. 1 and 7 and a conventional technology illustrated in FIG. 8, the Vcf near the interface between the Layers having different angles of fiber orientation is higher in the present invention than in the conventional technology, thus making it possible to enhance the electroconductivity between the Layers having different angles of fiber orientation.

Figure 9:
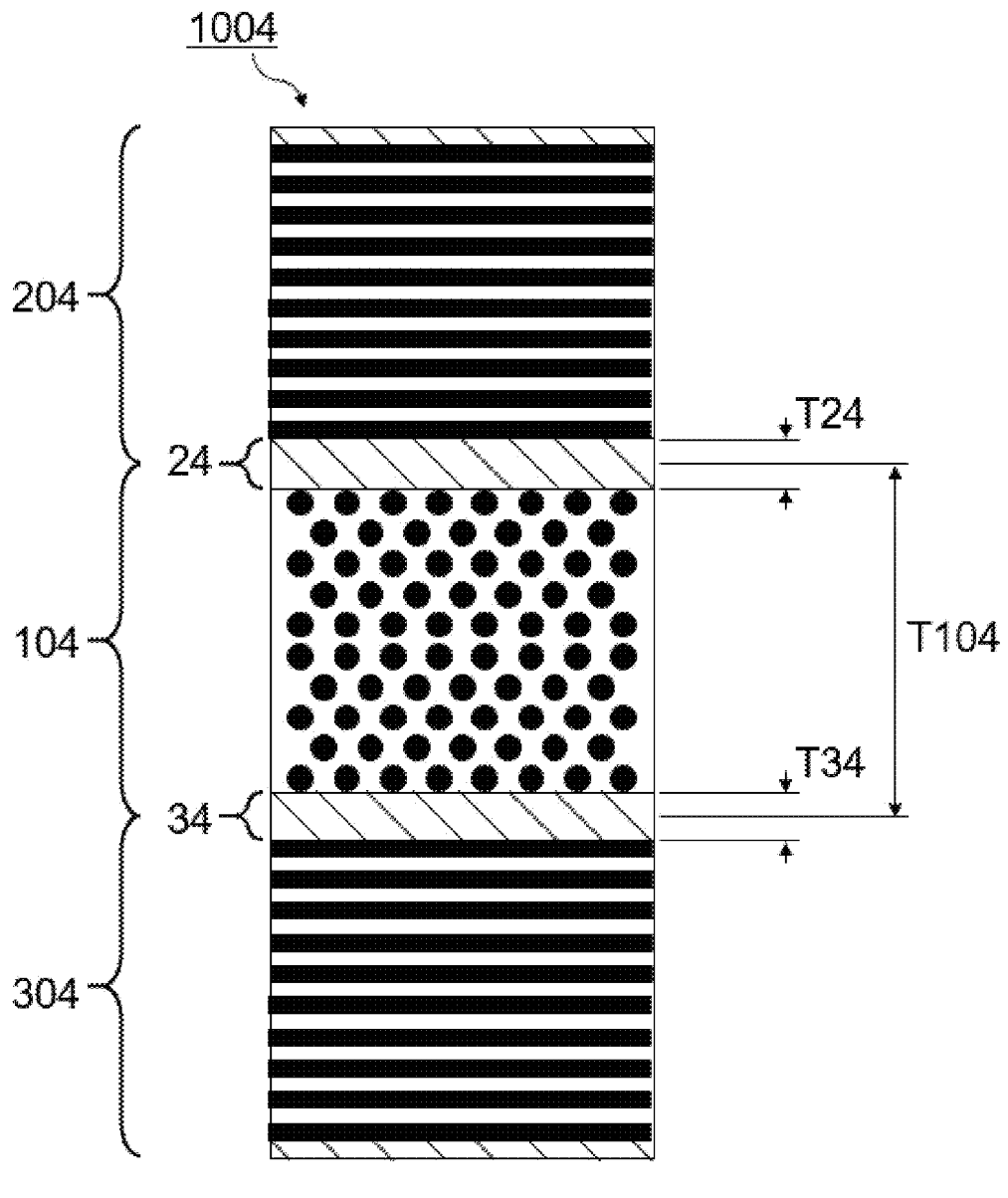
FIG. 9 is a cross-sectional view illustrating one form of a conventional interlaminar-reinforcement CFRP.

FIG. 9 is a cross-sectional view illustrating one form of a conventional interlaminar-reinforcement CFRP different from FIG. 8. The CFRP illustrated in FIG. 9 does not have a structure in which the Layer having the same angle of fiber orientation has high-Vcf Sublayers disposed as both outermost layers of the Layer, between which layers a low-Vcf Sublayer exists. Thick inter-Layer resin layers 24 and 34 each exist between the Layers. Such inter-Layer resin layers 24 and 34 are resin-rich layers mainly for enhancing the toughness, and often contain thermoplastic resin particles, fiber, nonwoven fabric, or the like inside. If the thickness and the average Vcf are each the same between Layers, the Vcf of a Layer of a conventional interlaminar-reinforcement CFRP and the Vcf of a high-Vcf Sublayer according to the present invention can be substantially the same. However, the inter-Layer resin layers 24 and 34 in the interlaminar-reinforcement CFRP often need to have a thickness equal to or larger than a given value. Accordingly, the electroconductivity between the Layers is higher in the present invention.

Figure 10:
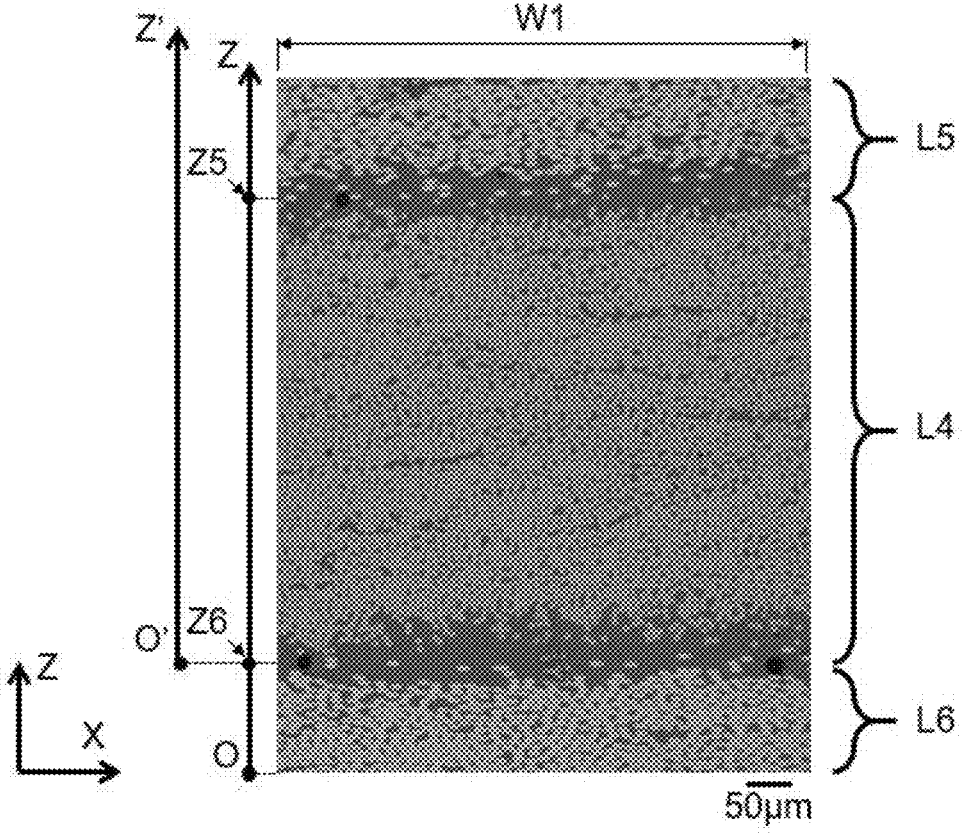
FIG. 10 is a cross-sectional photograph of one form of a conventional interlaminar-reinforcement CFRP.
Figure 11:
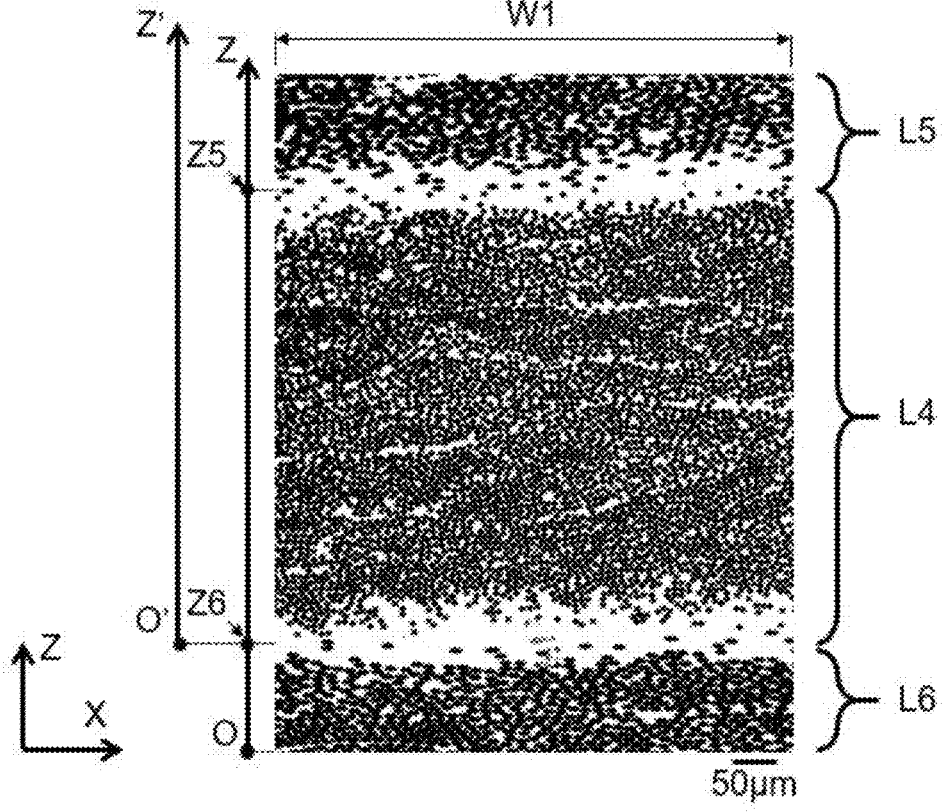
FIG. 11 is an image obtained by binarizing FIG. 10.
Figure 12:
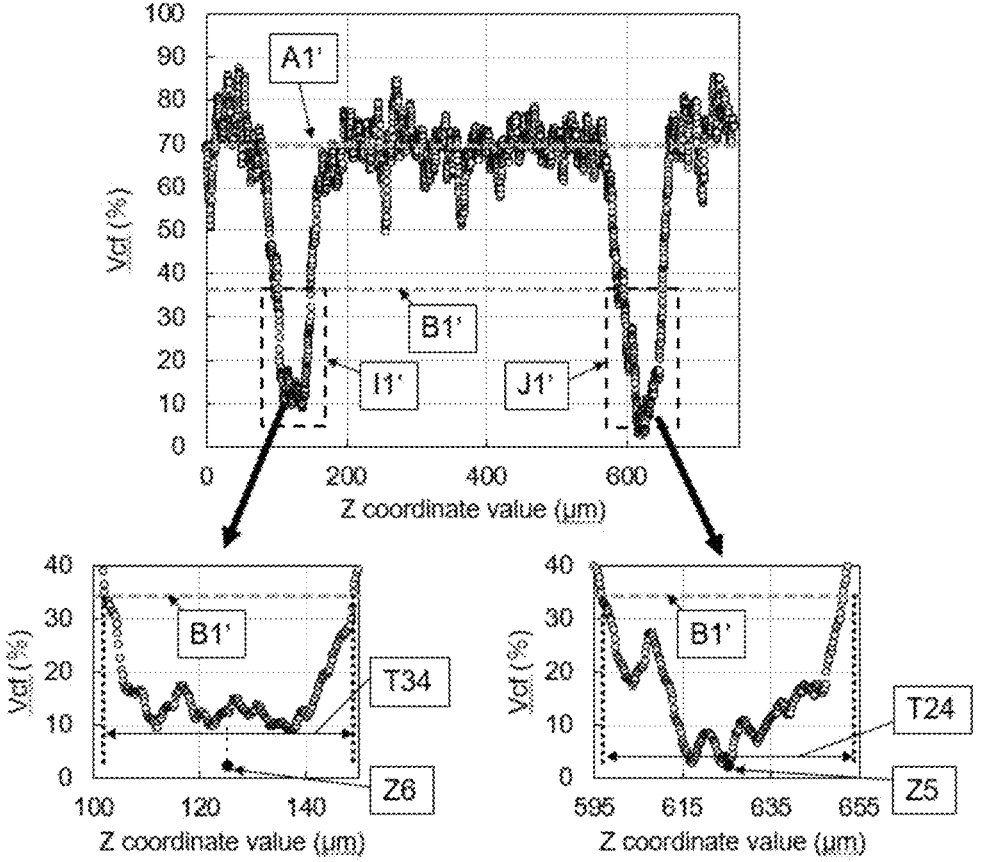
FIG. 12 presents a graph of the distribution of the Vcf in the Z direction in the cross section in FIG. 11, and presents the enlarged parts of the graph of the distribution.
Figure 13:
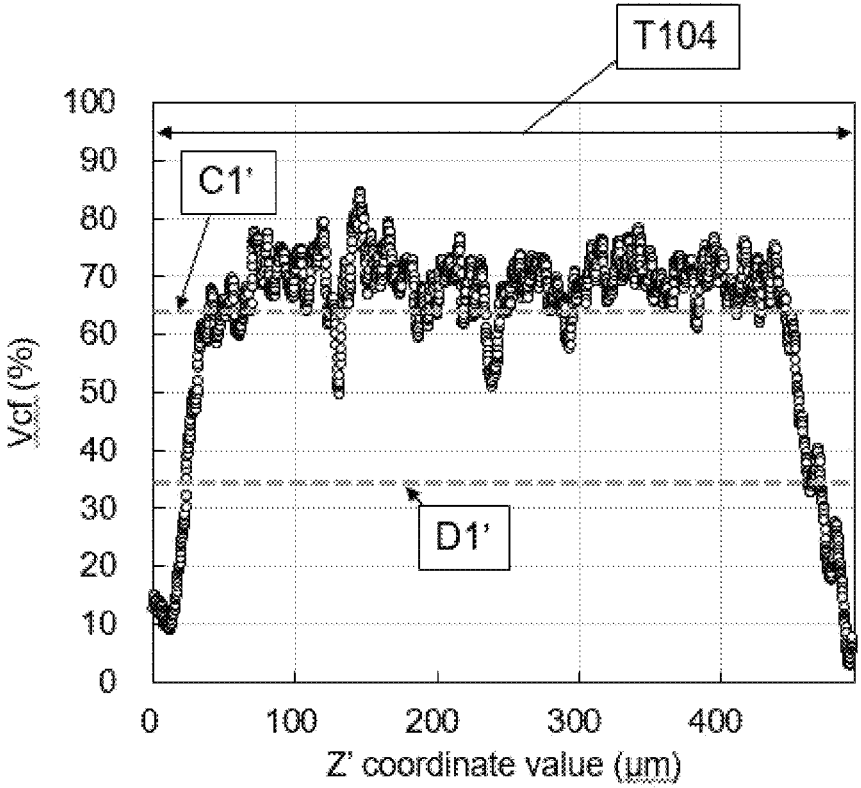
FIG. 13 is a graph of the distribution of the Vcf in the Z direction in the Layer L4 in FIG. 11.

A cross-sectional photograph of one form of a conventional interlaminar-reinforcement CFRP is illustrated in FIG. 10, and will be described in detail. FIG. 10 illustrates a Layer L4 and part of each of Layers L5 and L6 in the CFRP composed of the Layers L4, L5, and L6. To clarify the contrast between a resin portion and a CF portion, FIG. 11 is obtained by binarizing this FIG. 10. Using FIG. 11, the Z-direction distribution of the Vcf is calculated in the same manner as the above-described method to obtain a graph illustrated in FIG. 12. Subsequently, a boundary between the Layers is first determined in the same manner as the above-described method. In FIG. 12, the median of the Vcfs is A1', which is regarded as the representative value of the Vcfs of a region covering the Layer L4 and the Layers L5 and L6 that are contained in the cross-sectional photograph. Multiplying A1' by 0.5 affords B1' as a threshold for defining the inter-Layer resin layer. In FIG. 12, I1' and J1', which are portions having a Vcf lower than B1', exist near the boundary between the Layers. I1' and J1' are defined as inter-Layer resin layers, and the respective thicknesses T34 and T24 of the inter-Layer resin layers are each defined by the Z-coordinate length of the portion corresponding to each of I1' and J1'. The median values of the Z coordinates of the portions corresponding to I1' and J1' are the Z coordinates of the boundaries between the Layers L4 and L6 and between the Layers L4 and L5 respectively, and are Z6 and Z5 respectively. Next, with attention focused only on the Layer L4, the Z' axis shown in FIG. 11 is newly set, and the Z'-axis direction distribution of the Vcf in the Layer L4 is obtained accordingly as in FIG. 13. The thickness T104 of the Layer L4 is a value obtained by subtracting Z6 from Z5, and defined as the largest value of Z' coordinate. The average Vcf of the Layer L4 is defined by the average of the Z'-direction distribution of the Vcf, and corresponds to C1' in FIG. 13. A value obtained by multiplying C1' by 0.5 is a threshold for defining the low-Vcf Sublayer, and corresponds to D1'. Except the inter-Layer resin layers at the upper end and lower end of the Layer, a portion having a Vcf smaller than D1' does not exist, and thus, it is deemed that no low-Vcf Sublayer exists. The Layer L4 has an average Vcf equal to or larger than 50% as a whole, does not have a structure in which high-Vcf Sublayers are disposed as both outermost layers of the Layer with a low-Vcf Sublayer sandwiched between the high-Vcf Sublayers, and thus, is not the "specific Layer", not corresponding to a CFRP according to the present invention.

Figure 14:
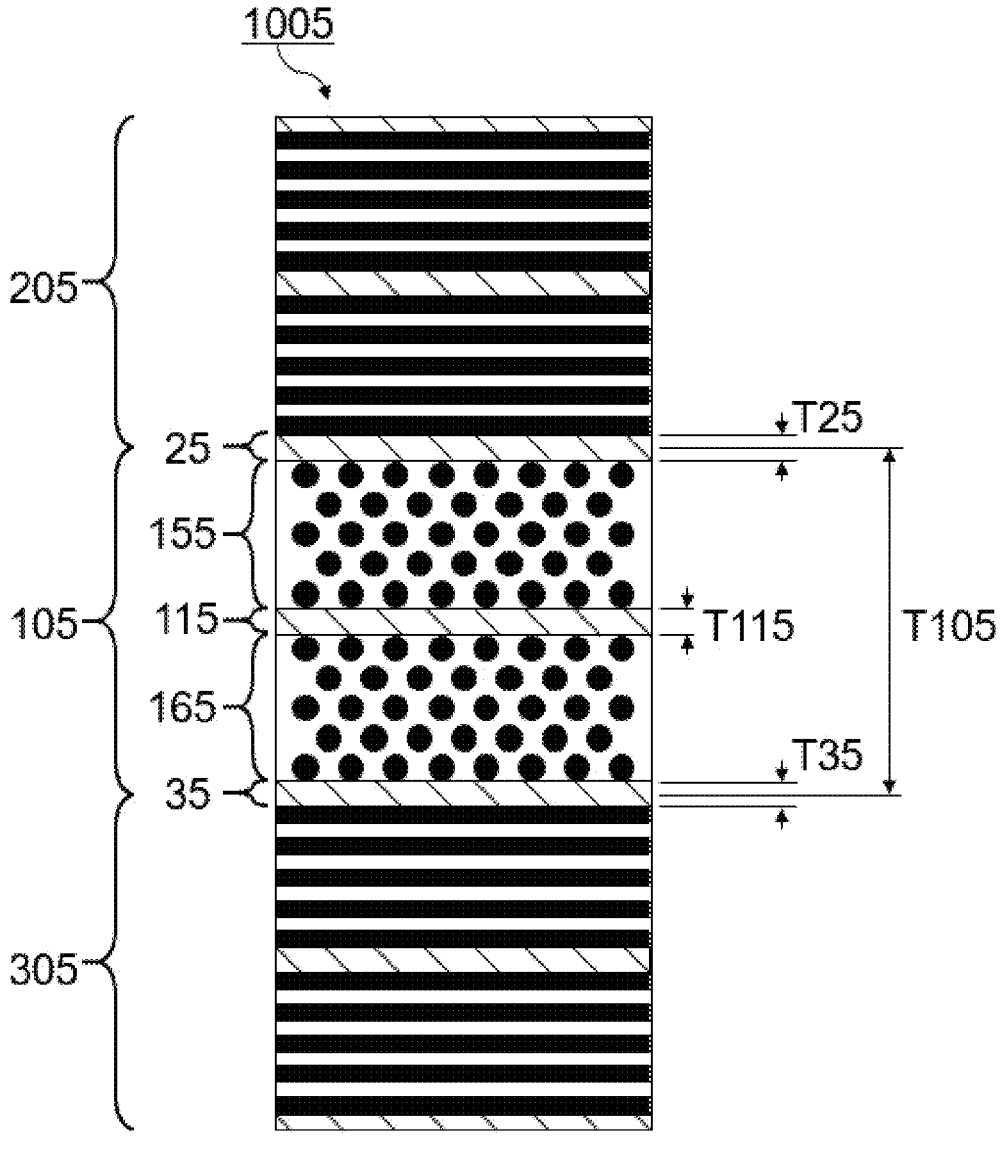
FIG. 14 is a cross-sectional view illustrating another form of a conventional interlaminar-reinforcement CFRP.

FIG. 14 is a cross-sectional view illustrating one form of a conventional interlaminar-reinforcement CFRP, and is different from FIG. 9. In the CFRP illustrated in FIG. 14, a low-Vcf Sublayer 115 in a Layer 105 having the same angle of fiber orientation is sandwiched between high-Vcf Sublayers 155 and 165. However, in the conventional interlaminar-reinforcement CFRP, the thicknesses T25 and T35 of the inter-Layer resin layers between the Layers having different angles of fiber orientation are thicker than 5 μm, and clearly distinguished from a CFRP according to the first invention. In this regard, the aspect in FIG. 14 is clearly distinguished from a CFRP according to the below-described second invention, as can be understood also from the fact that the inter-Layer resin layer in the aspect contains no electroconductive particle.

<Outline of One Embodiment of Second Invention of Present Invention>

In a second invention according to the present invention, "a resin portion exists between a specific Layer and a Layer adjacent to the specific Layer, and the resin portion contains electroconductive particles" in place of "the thickness of a resin portion between a specific Layer and at least one Layer adjacent to the specific Layer is 5 μm or less" in the first invention. In the first invention, the main point is to thin the inter-Layer resin layer to obtain electroconductivity between Layers by virtue of CFs, but in the second invention, electroconductivity between Layers is enhanced by virtue of electroconductive particles disposed in the inter-Layer resin layer. In general, the inter-Layer resin layer is often made in the form of a resin-rich layer for enhancing the toughness, and often contains thermoplastic resin particles, fiber, non-woven fabric, or the like inside. In this case, the inter-Layer resin layer to serve as an insulator tends to be thick, and thus, has electroconductive particles disposed therein.

<Electroconductive Particles>

Conductive particles to be used in the present invention can be particles that behave as an electrically good conductor, and the particles are not limited to electroconductive particles composed of a conductor alone. The volume-inherent resistance of the particles is preferably 10 to $10^{-9}$ Ωcm, more preferably $10^{-1}$ to $10^{-9}$ Ωcm. Examples of the electroconductive particles that can be used include metal particles, metal oxide particles, metal-coated inorganic particles, organic polymer particles, carbon particles, and the like. Among these, carbon particles have no problem of corrosion even when used for aircrafts, and thus, are preferable. Furthermore, using carbon particles having a (002) spacing of 3.4 to 3.7 Angstroms facilitates enhancing the electroconductivity, and thus, is preferable. For example, *Carbon*, No. 168, 157-163 (1995) states that, as an example of carbon particles, ICB manufactured by Nippon Carbon Co., Ltd. has a (002) spacing of 3.53 Angstroms, and is substantially spherical carbon particles. In addition, the literature also states that the spherical carbon particles are very hard, and difficult to deform even by compression, and furthermore, that removing the compression allows the shape of the particle to be restored.

The electroconductive particles to be used in the present invention can be disposed in a Layer, an inter-Layer resin layer between Layers having different angles of fiber orientation, and the like. The size of the electroconductive particle is preferably larger than the thickness of the inter-Layer resin layer. Specifically, the average particle size is preferably 20 μm or more, and the average particle size is more preferably 30 μm or more. The average particle size of the electroconductive particles, if too large, causes the structure of the resin layer between the CF sheets to be disturbed, and thus, the average particle size is preferably 60 μm or less. The average particle size of the electroconductive particles can be measured, using a light scattering method, for example, using Partica LA-950V2 manufactured by Horiba, Ltd., MT3300II manufactured by Microtrac, SALD series manufactured by Shimadzu Corporation, and the like.

<Matrix Resin>

A matrix resin to be used for a CFRP according to the present invention preferably contains a thermosetting resin, thermoplastic resin, and curing agent, may contain a thermosetting resin and a curing agent, or may contain only a thermoplastic resin. The thermosetting resin to be commonly used is an epoxy resin, and is preferably, in particular, an epoxy resin the precursor of which is an amine, a phenol, or a compound having a carbon-carbon double bond. Specific examples include, but are not limited to: epoxy resins the precursors of which are amines, such as various isomers of tetraglycidyl diaminodiphenylmethane, triglycidyl-p-aminophenol, triglycidyl-m-aminophenol, and triglycidylaminocresol; epoxy resins the precursors of which are phenols, such as bisphenol A epoxy resins, bisphenol F epoxy resins, bisphenol S epoxy resins, phenol novolac epoxy resins, and cresol novolac epoxy resins; epoxy resins the precursors of which are compounds having a carbon-carbon double bond, such as alicyclic epoxy resins; and the like. To enhance the tensile strength of a CFRP, it is effective to decrease the crosslinking density, but such a decrease decreases the heat resistance and the elastic modulus. To solve this, it is preferable to use a dicyclopentadiene type epoxy resin having a rigid backbone or a glycidyl aniline type epoxy resin that is a pendant type epoxy resin. In addition, a bromated epoxy resin obtained by bromating such an epoxy resin is also used. An epoxy resin the precursor of which is an aromatic amine and which is typified by tetraglycidyl diaminodiphenylmethane is suitable for the present invention because the epoxy resin has good heat resistance and good adhesiveness to CF.

The thermosetting resin is preferably used in combination with a curing agent. For example, for an epoxy resin, a curing agent can be used if the curing agent is a compound having an active group capable of reacting with an epoxy group. Preferably, a compound having an amino group, an acid anhydride group, or an azido group is suitable. Specifically, any kind of isomer of dicyandiamide or diaminodiphenyl sulfone is, and an amino benzoic acid esters is, suitable. Specifically, dicyandiamide provides prepreg with excellent storage stability, and thus, is used by preference. In addition, any kind of isomer of diaminodiphenyl sulfone affords a cured object having good heat resistance, and thus, is most suitable for the present invention. As the amino benzoic acid ester, triethyleneglycol di-p-aminobenzoate or neopentylglycol di-p-aminobenzoate is used by preference and has lower heat resistance but has excellent tensile strength, compared with diaminodiphenyl sulfone, and accordingly, is used selectively in accordance with the application. Needless to say, a curing catalyst can also be used, if necessary. In addition, a curing agent or a curing catalyst and a complexing agent capable of forming a complex can be used in combination in the sense of enhancing the pot life of a coating liquid.

In the present invention, a mixture of a thermosetting resin and a thermoplastic resin is also suitably used as a matrix resin. A mixture of a thermosetting resin and a thermoplastic resin affords better results than a thermosetting resin used singly. This is because a thermosetting resin and a thermoplastic resin have antinomic characteristics: that is, a thermosetting resin is generally disadvantageously brittle but can be molded at low pressure in an autoclave, and contrarily, a thermoplastic resin is generally advantageously tough but difficult to mold at low pressure in an autoclave, and accordingly, using these in mixture can effect a balance between properties and moldability. Such a mixture to be used preferably contains more than a thermosetting resin at 50 mass %, from the viewpoint of the mechanical characteristics of CFRP obtained by curing prepreg.

Examples of the thermoplastic resin that can be used include polymers having, in the main chain, a bond selected from a carbon-carbon bond, an amide bond, an imide bond, an ester bond, an ether bond, a carbonate bond, a urethane bond, a urea bond, a thioether bond, a sulfone bond, an imidazole bond, and a carbonyl bond. Specific examples include polyacrylate, polyolefin, polyamide (PA), aramid, polyester, polycarbonate (PC), polyphenylenesulfide (PPS), polybenzimidazole (PBI), polyimide (PI), polyetherimide (PEI), polysulfone (PSU), polyethersulfone (PES), polyetherketone (PEK), polyetheretherketone (PEEK), polyetherketoneketone (PEKK), polyaryletherketone (PAEK), polyamideimide (PAI), and the like. In fields requiring heat resistance, such as aircraft applications, PPS, PES, PI, PEI, PSU, PEEK, PEKK, PAEK, and the like are suitable. On the other hand, in industrial and automobile applications, a polyolefin such as polypropylene (PP); PA, polyester, PPS and the like are suitable in order to increase molding efficiency. These may be polymers, or oligomers or monomers may be used, because of the low viscosity and low temperature coating. Needless to say, these may be copolymerized in accordance with the purpose, or various kinds of them can be mixed to be used as polymer blends or alloys.

In a case where a thermoplastic resin is mainly used as a matrix resin, the term "cure" in the present invention is used for heat-treating prepreg produced by impregnation with a thermoplastic resin. Examples of this include heat treatment or the like during molding.

<Polymer Particle>

In the present invention, polymer particles are preferably used from the viewpoint of achieving both the formation of a low-Vcf Sublayer and the enhancement of the toughness. As such polymer particles, suitable ones described in WO2009/142231 as a reference can be used. More specifically, particles made of a polyamide resin or a polyimide resin can preferably be used, and a polyamide is most preferable. Examples of the polyamide that can be suitably used include nylon 12, nylon 11, nylon 6, nylon 66, a nylon 6/12 copolymer, a nylon modified into a semi-IPN (macromolecular interpenetrating network structure) by virtue of an epoxy compound described in Example 1 of JPH01-104624A (semi-IPN nylon), and the like. This polymer particle is preferably in round shape, particularly spherical shape. More specifically, the sphericity of the polymer particle is preferably 85% or more, more preferably 90% or more. Here, the sphericity (the unit, %) is determined as follows: 30 particles are randomly selected from a cross-sectional photograph of an FRP; and the minor axis and the major axis (the unit is the same, typically μm) are used in accordance with the following mathematical formula.

$$S = \sum_{i=1}^{n} (b/a)/n \times 100 \qquad \text{[Math. 1]}$$

Here, S is the sphericity, a is the major axis, b is the minor axis, and n is 30, the number of measurements.

Examples of commercially available products of the spherical polymer particles include: polyamide-based products, SP-500 and SP-10 (manufactured by Toray Industries, Inc.); polymethyl methacrylate-based products, MBX series such as MBX-12 and SSX series such as SSX-115 (manufactured by Sekisui Kasei Co., Ltd.); polystyrene-based products, SBX series such as SBX-12 (manufactured by Sekisui Kasei Co., Ltd.), and in addition, copolymers thereof, MSX and SMX (manufactured by Sekisui Kasei Co., Ltd. manufactured by); polyurethane-based products, DAIMICBEAZ CM series, and cellulose acetate-based products, BELLOCEA (manufactured by Daicel Corporation); phenol resin-based products, MARILIN (manufactured by Gunei Chemical Industry Co., Ltd.); and the like. Further examples of the spherical particles composed of a polyamide and a copolymer thereof include: polyamide-based particles described in Example 1 in JPH01-104624A; polyamide-based particles described in WO2018/207728; and the like. In addition, examples of the polyethersulfone-based spherical particles include particles described in JP2017-197665A. Among these, polyamide-based particles described in Example 1 in JPH01-104624A have excellent wet heat resistance, chemical resistance, and the like, and are still more preferable. The particle size of polymer particles to be added in the production of an intermediate base material is preferably 5 μm or more and 45 μm or less in terms of the mode diameter determined by a light scattering method. The mode diameter of the polymer particles is more preferably 10 to 20 μm. The particle size can be measured, using a light scattering method, for example, using Partica LA-950V2 manufactured by Horiba, Ltd., MT3300II manufactured by Microtrac, SALD series manufactured by Shimadzu Corporation, and the like.

Next, a method of obtaining a CFRP according to the present invention will be described, taking, for example, UD prepreg produced using a matrix resin mainly containing a thermosetting resin.

<Method of Producing Prepreg Laminate According to Present Invention>

A method of obtaining a prepreg laminate as a precursor of a CFRP according to the present invention is not particularly limited. For example, the below-described method can be used. First, a combination of an epoxy resin, an aromatic amine type curing agent, and a thermoplastic resin is kneaded to prepare a primary resin composition (hereinafter referred to as a "primary resin"), and then, a primary resin film is produced using a coater. Then, carbon fiber bundles are paralleled into a UD sheet, and impregnated with the primary resin to obtain primary prepreg. When this is done, increasing the resin content of the primary prepreg, and increasing the degree of impregnation of the CF bundles (a UD sheet) with the resin are preferable in the production of a CFRP having a smaller void.

Next, in this example, polymer particles are further added to an epoxy resin, an aromatic amine type curing agent, and a thermoplastic resin to prepare a secondary resin composition (hereinafter referred to as a "secondary resin"), and a secondary resin film is produced using a coater.

Figure 15:
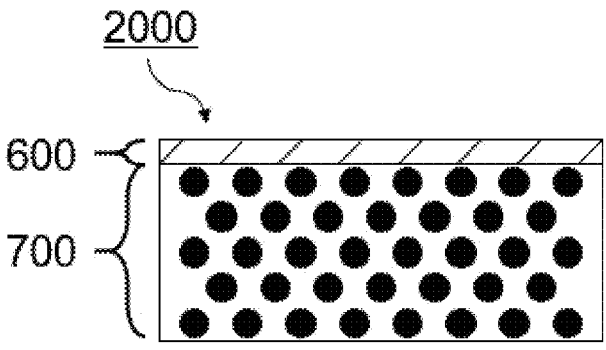
FIG. 15 is a cross-sectional view illustrating one form of an intermediate base material for obtaining a CFRP according to the first invention.

Then, the secondary resin is provided only on one face of the primary prepreg. The resulting product is preheated, and then pressed by a nip roll to be laminated. When this is done, it is desirable to sufficiently perform the preheating, and to sufficiently secure the fluidity of the secondary resin. The prepreg obtained in this manner, and provided with the secondary resin only on one face is herein referred to as 1.5-ary prepreg. Bringing, to 30 to 40 mass %, the resin content of prepreg to be used in the present invention makes it possible to inhibit the generation of a void in a molding process, and further enhance the mechanical characteristics of the CFRP, particularly toughness. The resin content of the prepreg is more preferably 32 to 36 mass %. FIG. 15 is a cross-sectional view illustrating one form of the 1.5-ary prepreg. In the 1.5-ary prepreg 2000, a secondary resin 600 is provided only on one face of primary prepreg 700.

Figure 16:
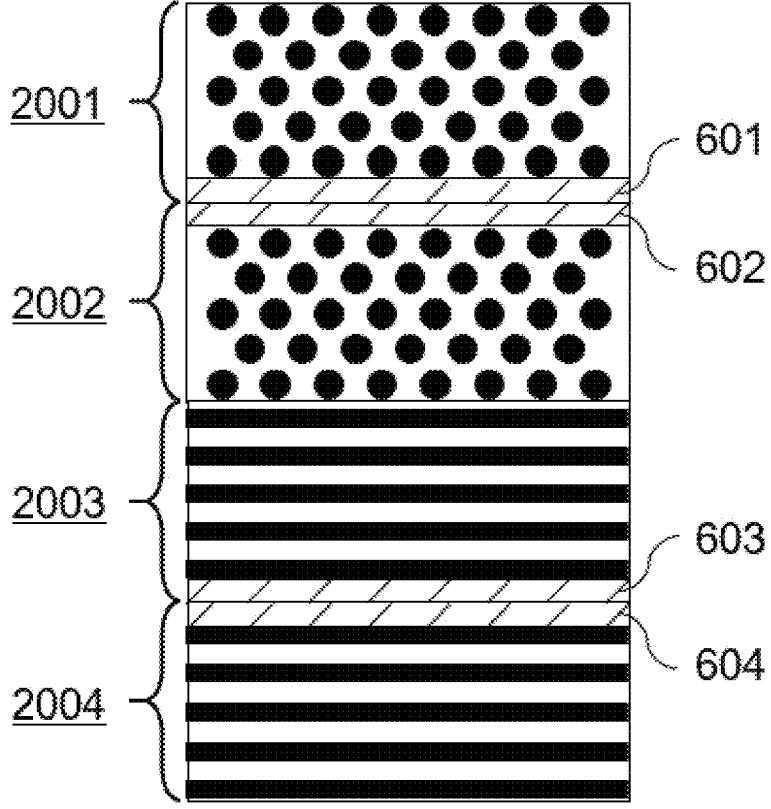
FIG. 16 is a cross-sectional view illustrating one form of a prepreg laminate for obtaining a CFRP according to the first invention.

Next, the 1.5-ary prepreg is laminated to produce a prepreg laminate. Two sheets of the 1.5-ary prepreg are assumed as one set. When laminated, the sheets of the 1.5-ary prepreg in each set are made to have an angle of fiber orientation in the same direction, and are laminated in such a manner that the face of one sheet is in contact with the face of the other, the faces being the ones provided with the secondary resin. In this manner, the angle of fiber orientation becomes unidirectional in each set, and a resin-rich low-Vcf Sublayer composed of the secondary resin is disposed as the intermediate portion of each set in the thickness direction. Laminating sets of two sheets of the 1.5-ary prepreg multidirectionally affords a prepreg laminate for obtaining a CFRP according to the present invention. FIG. 16 is a cross-sectional view of a prepreg laminate obtained by the above-described method. Here, the 1.5-ary prepreg sheets 2001 and 2002 are assumed as one set (that is, the fibers are oriented in the same direction, and thus, 2001 and 2002 are regarded as one Layer. The meaning of the "set" is the same in this paragraph and below), and the 1.5-ary prepreg sheets 2003 and 2004 are assumed as another set.

Figure 22:
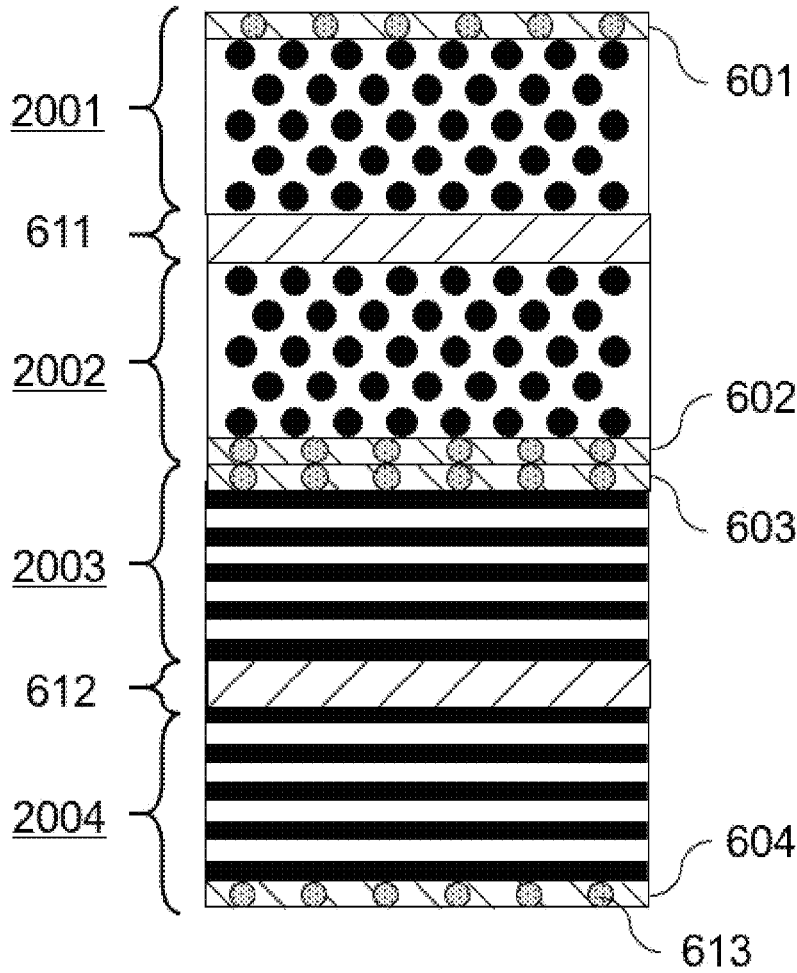
FIG. 22 is a cross-sectional view illustrating one form of a prepreg laminate for obtaining a CFRP according to the second invention.

In this regard, in the case of the second invention, electroconductive particles are added to the secondary resin. Then, in this example, polymer particles are further added to an epoxy resin, an aromatic amine type curing agent, and a thermoplastic resin to prepare a tertiary resin composition (hereinafter referred to as a "tertiary resin"), and a film made of a tertiary resin (tertiary resin film) is produced using a coater. Next, the 1.5-ary prepreg and the tertiary resin film are laminated to produce a prepreg laminate. Two sheets of the 1.5-ary prepreg and one tertiary resin film are assumed as one set. When laminated, the sheets of the 1.5-ary prepreg in each set are made to have an angle of fiber orientation in the same direction, and the sheets of the prepreg are laminated in such a manner that the face of one sheet is opposed to the face of the other, the faces being the ones not provided with the secondary resin, and laminated in such a manner that the tertiary resin is sandwiched between these faces. In this manner, the angle of fiber orientation becomes unidirectional in each set, and a resin-rich low-Vcf Sublayer composed of the tertiary resin is disposed as the intermediate portion of each set in the thickness direction. Laminating sets of two sheets of the 1.5-ary prepreg and a tertiary resin multidirectionally affords a prepreg laminate for obtaining a CFRP according to the present invention. FIG. 22 is a cross-sectional view of a prepreg laminate obtained by the above-described method. Here, the 1.5-ary prepreg sheets 2001 and 2002 and the tertiary resin 611 are assumed as one set, and the 1.5-ary prepreg sheets 2003 and 2004 and the tertiary resin 612 are assumed as another set.

Figure 17:
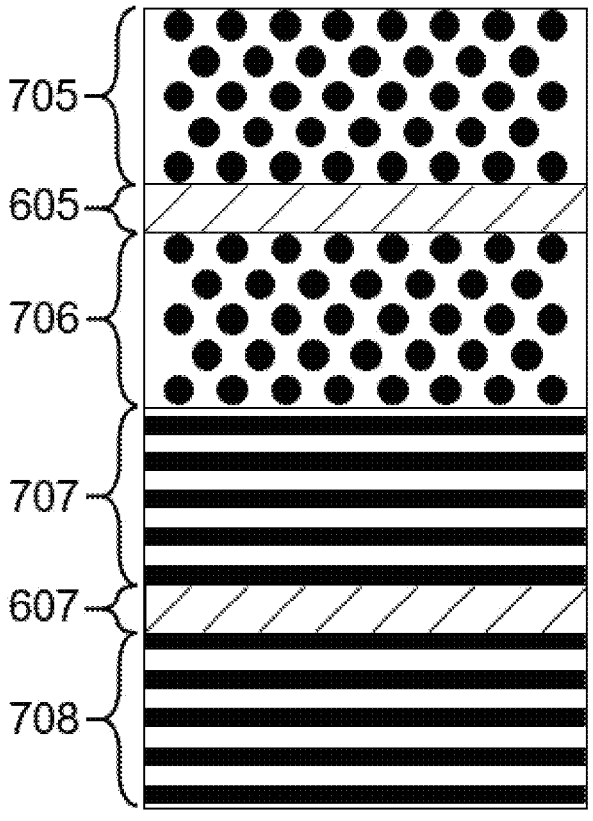
FIG. 17 is a cross-sectional view illustrating one form of a prepreg laminate for obtaining a CFRP according to the first invention.

Additionally, in another method of producing a prepreg laminate according to the present invention, primary prepreg and a sheet composed of an air-permeable sheet-like base material and a resin can be used in combination. Examples of the air-permeable sheet-like base material that can be used include various materials as above-described. Below, an example in which glass fiber woven fabric prepreg is used will be described. In the laminating of prepreg, two sheets of the primary prepreg and one sheet of the glass fiber woven fabric prepreg are assumed as one set. In each set, the sheets of the primary prepreg are made to have an angle of fiber orientation in the same direction, and the glass fiber woven fabric prepreg is sandwiched between the two sheets of the primary prepreg. In this manner, the angle of fiber orientation of the CFs becomes unidirectional in each set, and a resin-rich low-Vcf Sublayer composed of the glass fiber woven fabric prepreg is disposed as the intermediate portion of each set in the thickness direction. Laminating this set multidirectionally affords a prepreg laminate according to the present invention. FIG. 17 is a cross-sectional view illustrating one form of a prepreg laminate according to the present invention. Here, the primary prepreg sheets 705 and 706 and the glass woven fabric prepreg 605 are assumed as one set, and the primary prepreg sheets 707 and 708 and the glass woven fabric prepreg 607 are assumed as another set. In this regard, a resin film can be used in place of the sheet composed of an air-permeable sheet-like base material and a resin.

In addition, a prepreg laminate can be produced by laminating primary prepreg and an air-permeable sheet-like base material not impregnated with a resin. Using an air-permeable sheet-like base material allows a matrix resin to flow into the base material during hot molding, making it possible to achieve the effect for facilitating the enhancement of the Vcf of the portion becoming a high-Vcf Sublayer. Two sheets of the primary prepreg and one air-permeable sheet-like base material are assumed as one set. When laminated, the sheets of the primary prepreg in each set are made to have an angle of fiber orientation in the same direction, and the air-permeable sheet-like base material is sandwiched between the two sheets of the primary prepreg. In this manner, the angle of fiber orientation becomes unidirectional in each set to form one Layer, and a low-Vcf Sublayer composed of the air-permeable sheet-like base material is disposed in the intermediate portion of each Layer in the thickness direction. Then, the above-described Layer is formed in a carbon fiber composite material obtained by curing. A Layer produced in such a manner can become the above-described "specific Layer" by curing. In this manner, a CFRP as in FIG. 17 above can be obtained. <Method of Producing CFRP According to Present Invention>

A prepreg laminate produced in this manner can be molded by what is called a heating-pressing molding method in which the laminate is shaped under pressing and heating, and simultaneously, the resin is cured. In the case of a laminate composed of the specific laminate set, the air-permeable sheet-like base material is impregnated, during pressing and heating, with a resin composition contained in the primary prepreg, and the laminate is molded. Whichever of a thermosetting resin and a thermoplastic resin the main component of the matrix resin may be, the heating-pressing molding method can be suitably selected from a pressing molding method, autoclaving molding method, vacuum pressure molding method, backing molding method, and the like.

A temperature for molding a CFRP is usually in the range of from 130° C. to 220° C. in a case where an epoxy resin is used.

An autoclaving molding method makes it easy to obtain a molded product having a smaller void, and thus, is desirable in a case where the main component of the matrix resin is a thermosetting resin. The pressure for molding by an autoclaving molding method differs depending on the thickness of the prepreg, the CF content by volume, and the like, and is usually from 0.1 MPa to 1.0 MPa. This makes it possible to obtain a high-quality CFRP having no defect such as a void.

A CFRP according to the present invention can be suitably used for a structure for an aircraft. Examples of the structure for an aircraft include a flat-plate-shaped structure, cylindrical structure, box-shaped structure, C-shaped structure, H-shaped structure, L-shaped structure, T-shaped structure, I-shaped structure, Z-shaped structure, hat-shaped structure, and the like. A combination of these structures constitute a component for an aircraft. The details are described, for example, by Torikai and Kuze, "*Koukuki no Kozo-sekkei*", 5th ed.; Japan Aeronautical Engineers' Association (2003). Such a structure can be obtained, for example, by shaping prepreg, as described in Paragraph [0084] in WO2017/110991.

EXAMPLES

Below, the present invention will be described in detail with reference to Examples. However, the scope of the present invention is not limited to these Examples. In this regard, the unit of compositional ratio, "part(s)", means part(s) by mass, unless otherwise specified. In addition, various characteristics (properties) were measured in an environment of a temperature of 23° C. and a relative humidity of 50%, unless otherwise specified.

<Raw Materials Used in Examples and Comparative Examples>

(1) Carbon Fiber

For a thermosetting CFRP, carbon fibers containing 24,000 filaments and having a tensile strength of 5.8 GPa and a tensile modulus of 280 GPa were used.

For a thermoplastic CFRP, carbon fibers containing 12,000 filaments and having a tensile strength of 4.5 GPa and a tensile modulus of 230 GPa were used.

(2) Epoxy Resin

"SUMIEPOXY (registered trademark)" ELM434 (tetraglycidyl diaminodiphenylmethane, manufactured by Sumitomo Chemical Co., Ltd.)

"EPICLON (registered trademark)" 830 (bisphenol F type epoxy resin, manufactured by DIC Corp.)

"TOREP (registered trademark)" A-204E (N,N-diglycidyl-p-phenoxyaniline, manufactured by Toray Fine Chemicals Co., Ltd.)

(3) Curing Agent

"SEIKACURE-S (registered trademark)" (4,4'-DDS, manufactured by Seika Corporation)

(4) Thermoplastic Resin

"SUMIKAEXCEL (registered trademark)" 5003P (PES, manufactured by Sumitomo Chemical Co., Ltd.)

"Toray Cetex (registered trademark)" TC1000 (PEI, manufactured by Toray Advanced Composites)

(5) Polymer Particles

Spherical polyamide 6 particles (having a mode diameter of 15 μm and a sphericity of 96%, manufactured by the below-described method)

With reference to WO2018/207728, 200 g of ε-caprolactam (manufactured by Toray Industries, Inc.), 800 g of polyethylene glycol (primary polyethylene glycol 20,000; the weight-average molecular weight, 18,600; manufactured by Wako Pure Chemical Industries, Ltd.) as a second component polymer, and 1,000 g of water were added to a 3 L autoclave equipped with an agitating blade of a helical ribbon type, so that a uniform solution was formed. Then, the autoclave was sealed and purged with nitrogen. Then, the stirring rate was set at 100 rpm, and the temperature was raised to 240° C. When this was done, the pressure of the system reached 10 kg/cm², and controlled by slightly releasing the water vapor pressure so as to maintain the pressure at 10 kg/cm². The temperature reached 240° C., and then, the pressure was released at a rate of 0.2 kg/cm² per minute. Then, with nitrogen flowing through, the temperature was maintained for one hour to complete polymerization. The solution was discharged into 2,000 g of water in a bath to obtain slurry. The dissolvable material was dissolved, and then filtrated. To the residue, 2,000 g of water was added, and the resulting mixture was washed at 80° C. Then, the solution was passed through a 200 μm sieve to remove aggregates. The resulting slurry liquid was again filtrated to isolate the residue, which was dried at 80° C. for 12 hours to produce 140 g of polyamide 6 powder. The melting point of the powder obtained was 218° C., the same as the melting point of polyamide 6. The crystallization temperature was 170° C. The particle size was measured using MT3300II (with a light source at 780 nm and 3 mW, and a wet cell (the medium, water)) manufactured by Microtrac.

(6) Electroconductive Particles (Carbon Particles)

"NICABEADS (registered trademark)" ICB (the average particle size (based on the number of particles), 27 μm; manufactured by Nippon Carbon Co. Ltd.)

<Methods of Various Evaluations>

(1) Preparation of Epoxy Resin Composition

In accordance with the composition shown in Table 1, an epoxy resin and a thermoplastic resin were kneaded. The resulting mixture was heated to 150° C. or more, and stirred as it was for one hour to dissolve the thermoplastic resin. A transparent viscous liquid was thus obtained. This liquid was cooled under kneading. Then, a curing agent was added, and the resulting mixture was further kneaded to obtain Resin-1 as a primary resin composition.

In addition, in accordance with the composition shown in Table 1, an epoxy resin and a thermoplastic resin were kneaded. The resulting mixture was heated to 150° C. or more, and stirred as it was for one hour to dissolve the thermoplastic resin. A transparent viscous liquid was thus obtained. This liquid was cooled under kneading. Then, a curing agent, polymer particles, electroconductive particles, and the like were added, and the resulting mixture was kneaded to obtain secondary resin compositions: Resin-A to Resin-F, Resin-A2, and Resin-B2 (hereinafter abbreviated as the secondary resin A to secondary resin F, secondary resin A2, and secondary resin B2 respectively in some cases). In addition, in accordance with the composition shown in Table 1, an epoxy resin and a thermoplastic resin were kneaded. The resulting mixture was heated to 150° C. or more, and stirred as it was for one hour to dissolve the thermoplastic resin. A transparent viscous liquid was thus obtained. This liquid was cooled under kneading. Then, a curing agent, polymer particles, and the like were added, and the resulting mixture was further kneaded to obtain Resin-3 as a tertiary resin composition.

The compositional ratios of resin compositions in Examples and Comparative Examples are shown in Table 1.

(2) Production of CF prepreg

The following three kinds of CF prepreg were produced.

A. Primary Prepreg

A one-stage impregnating method was used for the production. To release paper coated with silicone, the primary resin composition (Resin-1) produced in (1) was uniformly applied using a coater, to form a primary resin film. Uniformly and unidirectionally paralleled carbon fibers were sandwiched between two primary resin films. The resulting product was heated and pressed using a press roll to obtain primary prepreg in which the unidirectionally arranged carbon fibers were impregnated sufficiently with the primary resin. Unless otherwise specified, the areal weight of the carbon fibers of the primary prepreg was 268 g/m², and the resin content was 20 mass %.

B. 1.5-ary Prepreg

A two-stage impregnating method was used for the production. First, primary prepreg was obtained in accordance with (2) A (unless otherwise specified, the areal weight of the carbon fibers was 268 g/m$^2$, and the resin content was 20 mass %). Next, to release paper coated with silicone, the primary resin composition or the secondary resin composition produced in (1) in accordance with each of Examples and Comparative Examples was uniformly applied using a coater, to form each secondary resin film. Next, the release paper was peeled off from one side of the primary prepreg. To the face from which the release paper had been peeled off in the primary prepreg, one secondary resin film was bonded. The resulting product was heated and pressed using a press roll, to obtain 1.5-ary prepreg in which the secondary resin composition was provided on one face of the primary prepreg. Unless otherwise specified, the areal weight of the carbon fibers of the 1.5-ary prepreg was 268 g/m$^2$, and the resin content was 34 mass %.

C. Secondary Prepreg

A two-stage impregnating method was used for the production. First, primary prepreg was obtained in accordance with (2) A (unless otherwise specified, the areal weight of the carbon fibers was 268 g/m$^2$, and the resin content was 20 mass %). Next, to release paper coated with silicone, the primary resin composition or the secondary resin composition produced in (1) in accordance with each of Examples and Comparative Examples was uniformly applied using a coater, to form a secondary resin film. Next, the release paper was peeled off from both sides of the primary prepreg. Then, the primary prepreg was sandwiched between the secondary resin films. The resulting product was heated and pressed using a press roll to obtain secondary prepreg in which the primary prepreg was impregnated, through both faces thereof, with the secondary resin composition. The areal weight of the carbon fibers of the secondary prepreg was 268 g/m$^2$, and the resin content was 34 mass %.

(3) Production of Glass Fiber Woven Fabric Prepreg

A one-stage impregnating method was used for the production. To release paper coated with silicone, the primary resin composition (Resin-1) produced in (1) was uniformly applied using a coater, to form a primary resin film. A glass fiber woven fabric sheet was provided in the form of a sheet having a glass fiber diameter of approximately 6 μm and containing four layers of satin weaves. Then, the glass fiber woven fabric sheet was sandwiched between two primary resin films. The resulting product was heated and pressed using a press roll to obtain primary prepreg composed of the glass fiber woven fabric sheet impregnated sufficiently with the primary resin composition (the areal weight of the glass fiber woven fabric was 104 g/m$^2$, and the resin content was 39 mass %).

(4) Molding of CFRP

As below-described, a plurality of different forms of CFRPs were produced. For each CFRP, eight sets of the Layers produced were laminated in the structural form of [0/90]$_{2S}$, unless otherwise specified. In addition, the resin content of each Layer of the CFRP was in the range of from (the resin content of the prepreg used—0 mass %) to (the resin content of the prepreg used—1.5 mass %).

A. CFRP-A (Corresponding to the Layer Structure Illustrated in FIG. 1)

The 1.5-ary prepreg produced in accordance with (2) B using the resin composition described in the below-described Examples was cut to 100 mm×100 mm. Two cut sheets of the 1.5-ary prepreg were assumed as one set. The sheets of the prepreg in each set were made to have the same angle of fiber orientation, and were laminated in such a manner that the face of one sheet was in contact with the face of the other, the faces being the ones provided with the secondary resin (the resulting product is conveniently referred to as a "Layer A precursor").

For each set, the fiber areal weight was 536 g/m$^2$, and the resin content was 34 mass %. A total of eight sets were laminated to produce a perpendicularly intersecting prepreg laminate. In an autoclave, the perpendicularly intersecting prepreg laminate was molded at a temperature of 180° C. for 2 hours and under a pressure of 0.6 MPa at a heating rate of 1.5° C./minute to produce a CFRP-A. All the Layers of the CFRP-A were "specific Layers".

B. CFRP-B (Corresponding to the Layer Structure Illustrated in FIG. 6)

The 1.5-ary prepreg produced, as shown in Table 2, in accordance with (2) B using the primary resin composition and the secondary resin composition was cut to 100 mm×100 mm. Two cut sheets of the 1.5-ary prepreg were assumed as one set. The sheets of the prepreg were made to have the same angle of fiber orientation, and were laminated in such a manner that the face of one sheet was in contact with the face of the other, the faces being the ones provided with the secondary resin, and in such a manner that the resulting product had the same structural form as the Layer A precursor. Such one set was provided.

Next, secondary prepreg was produced in accordance with (2) C, and cut to 100 mm×100 mm. Two cut sheets of the secondary prepreg were assumed as one set. The sheets of the secondary prepreg in each set were laminated so as to have an angle of fiber orientation unidirectionally (the resulting product is conveniently referred to as a "Layer B precursor"). Seven such sets were provided.

Each set had the same fiber areal weight and resin content as the CFRP-A. The above-described eight sets were combined, and the set of the 1.5-ary prepreg was laminated as the second layer from the upper face to produce a perpendicularly intersecting prepreg laminate. The perpendicularly intersecting prepreg laminate was molded under the same conditions as A to produce a CFRP-B. In the CFRP-B, only the second Layer from the upper face was a "specific Layer".

C. CFRP-C (Similar to the Layer Structure Illustrated in FIG. 6)

The 1.5-ary prepreg and the secondary prepreg that were used for the CFRP-B were provided, and each cut to 100 mm×100 mm. Two cut sheets of the 1.5-ary prepreg were assumed as one set. The sheets of the prepreg were laminated in the same structural form as the Layer A precursor. Such one set was provided.

Next, two cut sheets of the secondary prepreg were assumed as one set. The sheets of the prepreg in each set were laminated in the same structural form as the Layer B precursor. Seven such sets were provided.

Each set had the same fiber areal weight and resin content as the CFRP-A. The above-described eight sets were combined, and the set of the 1.5-ary prepreg was laminated as the fourth layer from the upper face to produce a perpendicularly intersecting prepreg laminate. The perpendicularly intersecting prepreg laminate was molded under the same conditions as A to produce a CFRP-C. In the CFRP-C, only the fourth Layer from the upper face was a "specific Layer".

D. CFRP-D (Corresponding to the Layer Structure Illustrated in FIG. 1)

The primary prepreg and the glass fiber woven fabric prepreg produced in accordance with 2 (A) and 3 respectively were cut to 100 mm×100 mm. Two cut sheets of the primary prepreg and one cut sheet of the glass fiber woven fabric prepreg were assumed as one set. In each set, the two sheets of the primary prepreg were made to have an angle of fiber orientation in the same direction, and the one sheet of the glass fiber woven fabric prepreg was sandwiched between the two sheets of the primary prepreg, and laminated. Eight such sets were provided.

For each set, the fiber areal weight was 536 g/m². Assuming that the glass fiber is also a constituent of the matrix resin, the resin content was 36 mass %. A total of eight sets of the prepreg were laminated to produce a perpendicularly intersecting prepreg laminate. The perpendicularly intersecting prepreg laminate was molded under the same conditions as A to produce a CFRP-D. All the Layers of the CFRP-D were "specific Layers".

E. CFRP-E (Corresponding to the Layer Structure Illustrated in FIG. 9)

The 1.5-ary prepreg produced in accordance with (2) B using the resin composition described in the below-described Comparative Examples was cut to 100 mm×100 mm. Two cut sheets of the 1.5-ary prepreg were assumed as one set. The sheets of the 1.5-ary prepreg in each set were made to have an angle of fiber orientation unidirectionally, and were laminated in such a manner that the face of one sheet of prepreg was in contact with the face of the other, the faces being the ones not provided with the secondary resin. Resin-rich portions composed of the secondary resin were disposed on both faces of each set, and molded to become a thick inter-Layer resin layer.

Each set had the same fiber areal weight and resin content as the CFRP-A. A total of eight sets of the 1.5-ary prepreg were laminated to produce a perpendicularly intersecting prepreg laminate. The perpendicularly intersecting prepreg laminate was molded under the same conditions as A to produce a CFRP-E. The CFRP-E had no low-Vcf Sublayer, and thus, is not a CFRP according to the present invention.

F. CFRP-F (Corresponding to the Layer Structure Illustrated in FIG. 8)

The primary prepreg produced by the method described in (2) A was impregnated, through both faces thereof, with Resin-1 (the resin composition having the same composition as the primary resin composition shown in Table 1). Secondary prepreg was thus produced. This secondary prepreg was cut to 100 mm×100 mm. Two cut sheets of the secondary prepreg were assumed as one set. Each set was obtained by laminating the sheets of the secondary prepreg in such a manner that the sheets of the secondary prepreg had an angle of fiber orientation unidirectionally, and in such a manner that the set had the same structure as the set of the secondary prepreg in B. Before molding, the resin-rich portion composed of the primary resin existed in the central portion of each set in the thickness direction, but the set did not contain polymer particles or glass fiber woven fabric as a spacer. Thus, the CFs flowed during molding, and the resin-rich portion disappeared after molding.

Each set had the same fiber areal weight and resin content as the CFRP-A. A total of eight sets of the secondary prepreg were laminated to produce a perpendicularly intersecting prepreg laminate. The perpendicularly intersecting prepreg laminate was molded under the same conditions as A to produce a CFRP-F. The CFRP-F had no low-Vcf Sublayer, and thus, is not a CFRP according to the present invention.

G. CFRP-G (Corresponding to the Layer Structure Illustrated in FIG. 14)

The secondary prepreg produced using the resin composition described in the below-described Comparative Examples was cut to 100 mm×100 mm. Two cut sheets of the secondary prepreg were assumed as one set. Each set was obtained by laminating the sheets of the secondary prepreg in such a manner that the sheets of the secondary prepreg had an angle of fiber orientation unidirectionally, and in such a manner that the set had the same structure as the set in section F. In the central portion of each set in the thickness direction, a resin-rich portion composed of the secondary resin was disposed, and simultaneously, resin-rich portions composed of the secondary resin were disposed on both faces of each set, and became thick inter-Layer resin layers after molding.

For each set, the fiber areal weight was 536 g/m², and the resin content was 34 mass %. A total of eight sets of the secondary prepreg were laminated to produce a perpendicularly intersecting prepreg laminate. The perpendicularly intersecting prepreg laminate was molded under the same conditions as A to produce a CFRP-G. The CFRP-G contained the "specific Layer", but had a thick inter-Layer resin layer, and thus, is not a CFRP according to the first invention.

H. CFRP-H (Corresponding to the Layer Structure Illustrated in FIG. 1)

The 1.5-ary prepreg was produced in accordance with the compositions of the primary resin and the secondary resin A shown in Table 1. The secondary resin film was allowed to have the same areal weight as the CFRP-A. However, the areal weight of the primary resin film was increased, and the whole 1.5-ary prepreg was allowed to have a larger resin content than the CFRP-A. That is, the primary prepreg was produced so as to have a CF areal weight of 268 g/m² and a resin content of 29 mass %, and the 1.5-ary prepreg was produced to have a CF areal weight of 268 g/m² and a resin content of 40 mass %.

The above-described 1.5-ary prepreg was cut to 100 mm×100 mm. Two cut sheets of the 1.5-ary prepreg were assumed as one set. Each set was obtained as follows: the sheets of the prepreg were made to have the same angle of fiber orientation, and were laminated in such a manner that the face of one sheet was in contact with the face of the other, the faces being the ones provided with the secondary resin, and in such a manner that the set had the same structure as A.

For each set, the fiber areal weight was 536 g/m², and the resin content was 40 mass %. A total of eight sets of the 1.5-ary prepreg were laminated to produce a perpendicularly intersecting prepreg laminate. The perpendicularly intersecting prepreg laminate was molded under the same conditions as A to produce a CFRP-H. All the Layers of the CFRP-H were "specific Layers".

I. CFRP-I (Corresponding to the Layer Structure Illustrated in FIG. 9)

The same 1.5-ary prepreg as used for H was cut to 100 mm×100 mm. Two cut sheets of the 1.5-ary prepreg were assumed as one set. The sheets of the 1.5-ary prepreg were made to have an angle of fiber orientation unidirectionally, and were laminated in such a manner that the face of one sheet of prepreg was in contact with the face of the other, the faces being the ones not provided with the secondary resin. Thus, in the central portion of each set in the thickness direction, a resin-rich portion was not disposed, and instead, resin-rich portions composed of the secondary resin were disposed on both faces of each set, and became thick inter-Layer resin layers after molding.

For each set, the fiber areal weight was 536 g/m², and the resin content was 40 mass %. A total of eight sets of the 1.5-ary prepreg were laminated to produce a perpendicularly intersecting prepreg laminate. The perpendicularly intersecting prepreg laminate was molded under the same conditions as A to produce a CFRP-I. The CFRP-I had no low-Vcf Sublayer, and thus, is not a CFRP according to the present invention.

J. CFRP-J (Corresponding to the Layer Structure Illustrated in FIG. 1)

Thermoplastic UD prepreg (the areal weight of the carbon fibers, 142 g/m$^2$; the resin, TC1000 (PEI); the resin content, 33 mass %) and a thermoplastic resin film (the resin, TC1000; the thickness of the film, 50 μm) were used, and each was cut to 100 mm×100 mm. Two cut sheets of the thermoplastic UD prepreg were assumed as one pair. The sheets in one pair were made to have an angle of fiber orientation unidirectionally. One sheet of the thermoplastic resin film sandwiched between two pairs was assumed as one set.

Each set including the thermoplastic film sandwiched between the sets had a fiber areal weight of 568 g/m$^2$ and a resin content of 38 mass %. A total of eight sets of the UD prepreg were laminated to produce a perpendicularly intersecting prepreg laminate. Using a press machine, the perpendicularly intersecting prepreg laminate was retained at a temperature of 340° C. at a pressure of 3 MPa for 7 minutes to be molded, so that a CFRP-J was produced. All the Layers of the CFRP-J were "specific Layers".

K. CFRP-K (Corresponding to the Layer Structure Illustrated in FIG. 9)

The same thermoplastic UD prepreg as used for J and the same thermoplastic resin film as used for J were used, and each was cut to 100 mm×100 mm. Four cut sheets of the thermoplastic UD prepreg were assumed as one set. The sheets in one set were laminated so as to have an angle of fiber orientation unidirectionally. When a plurality of sets were laminated, one sheet of the thermoplastic resin film was sandwiched between the sets. Thus, in the central portion of each set in the thickness direction, a resin-rich portion was not disposed, and instead, resin-rich portions were disposed on both faces of each set, and became thick inter-Layer resin layers after molding.

Each set had the same fiber areal weight and resin content as the CFRP-J. A total of eight sets of the UD prepreg were laminated to produce a perpendicularly intersecting prepreg laminate. The perpendicularly intersecting prepreg laminate was molded under the same conditions as J to produce a CFRP-K. The CFRP-K had no low-Vcf Sublayer, and thus, is not a CFRP according to the present invention.

L. CFRP-L (Corresponding to the Layer Structure Illustrated in FIG. 7)

The same thermoplastic UD prepreg as used for J and a thermoplastic UD prepreg having a higher resin content (the areal weight of carbon fibers, 142 g/m$^2$; the resin, TC1000; the resin content, 40 mass %) were provided. The former and the latter are referred to as a high-Vcf UD prepreg and a mid-Vcf UD prepreg respectively. Furthermore, the same thermoplastic resin film as used for section J was provided. The above-described materials were each cut to 100 mm×100 mm. Two cut sheets of each kind of UD prepreg were assumed as one pair, and three pairs were assumed as one set. All the sheets of the UD prepreg constituting each set were made to have an angle of fiber orientation in the same direction, and one sheet of the thermoplastic resin film was sandwiched between one pair and another. Here, two of the three pairs were constituted by the high-Vcf UD prepreg, between which two pairs, one pair constituted by the mid-Vcf UD prepreg was sandwiched.

For each set, the fiber areal weight was 852 g/m$^2$, and the resin content was 39 mass %. A total of eight sets of the UD prepreg were laminated to produce a perpendicularly intersecting prepreg laminate. The perpendicularly intersecting prepreg laminate was molded under the same conditions as J to produce a CFRP-L. All the Layers of the CFRP-L were "specific Layers".

M. CFRP-M (Corresponding to the Layer Structure Illustrated in FIG. 7)

The same high-Vcf UD prepreg, mid-Vcf UD prepreg, and thermoplastic resin film as used for L were provided, and each was cut to 100 mm×100 mm. Two cut sheets of each kind of UD prepreg were assumed as one pair, and three pairs were assumed as one set. All the sheets of the UD prepreg constituting each set were made to have an angle of fiber orientation in the same direction, and one sheet of the thermoplastic resin film was sandwiched between one pair and another. Here, two of the three pairs were constituted by the high-Vcf UD prepreg, and the other pair was constituted by the mid-Vcf UD prepreg. Each set was constituted such that one pair composed of the high-Vcf UD prepreg was sandwiched between one pair composed of the mid-Vcf UD prepreg and the other pair composed of the high-Vcf UD prepreg.

Each set had the same fiber areal weight and resin content as the CFRP-L. A total of eight sets of the UD prepreg were laminated to produce a perpendicularly intersecting prepreg laminate. The one pair composed of the mid-Vcf UD prepreg was laminated so as to be the top part of each set. The perpendicularly intersecting prepreg laminate was molded under the same conditions as J to produce a CFRP-M. All the Layers of the CFRP-M were "specific Layers". Differently from the CFRP-L, the CFRP-M was in the form in which the high-Vcf Sublayer having the lowest average Vcf in the three high-Vcf Sublayers existing in the "specific Layer" was disposed as one of the outermost parts.

N. CFRP-N (Corresponding to the Layer Structure Illustrated in FIG. 22)

The 1.5-ary prepreg A2 was produced using the resin composition described in the below-described Examples. In addition, release paper coated with silicone was uniformly coated, using a coater, with the tertiary resin produced in (1) with the tertiary resin composition, and shown in Table 1, to obtain a tertiary resin film (the resin areal weight, 28 g/m$^2$). These materials were each cut to 100 mm×100 mm. Two cut sheets of the 1.5-ary prepreg A2 and one sheet of the tertiary resin film were assumed as one set. The sheets of the 1.5-ary prepreg A2 in each set were made to have the same angle of fiber orientation, and the sheets were laminated in such a manner that the face of one sheet was opposed to the face of the other, the faces being the ones not provided with the secondary resin, and in such a manner that the tertiary resin was sandwiched between these faces.

For each set, the fiber areal weight was 536 g/m$^2$, and the resin content was 34 mass %. Each set was constituted in the form of [0/90]$_{2S}$. A total of eight sets were laminated to produce a perpendicularly intersecting prepreg laminate. In an autoclave, the perpendicularly intersecting prepreg laminate was molded at a temperature of 180° C. for 2 hours and under a pressure of 0.6 MPa at a heating rate of 1.5° C./minute to produce a CFRP-N. All the Layers of the CFRP-N were "specific Layers".

O. CFRP-O

The 1.5-ary prepreg B2 was produced using the resin composition described in the below-described Comparative Examples, and cut to 100 mm×100 mm. Two cut sheets of the 1.5-ary prepreg B2 were assumed as one set. The sheets of the 1.5-ary prepreg B2 in each set were made to have the same angle of fiber orientation, and were laminated in such a manner that the face of one sheet was in contact with the face of the other, the faces being the ones not provided with the secondary resin.

For each set, the fiber areal weight was 536 g/m$^2$, and the resin content was 34 mass %. Each set was constituted in the form of [0/90]$_{2S}$. A total of eight sets were laminated to produce a perpendicularly intersecting prepreg laminate. The perpendicularly intersecting prepreg laminate was molded in an autoclave under the same conditions as section N to produce a CFRP. The CFRP-O had no low-Vcf Sublayer and accordingly no "specific Layer", and thus, is not a CFRP according to the present invention.

(5) Cross-Sectional Observation of CFRP

Figure 18:
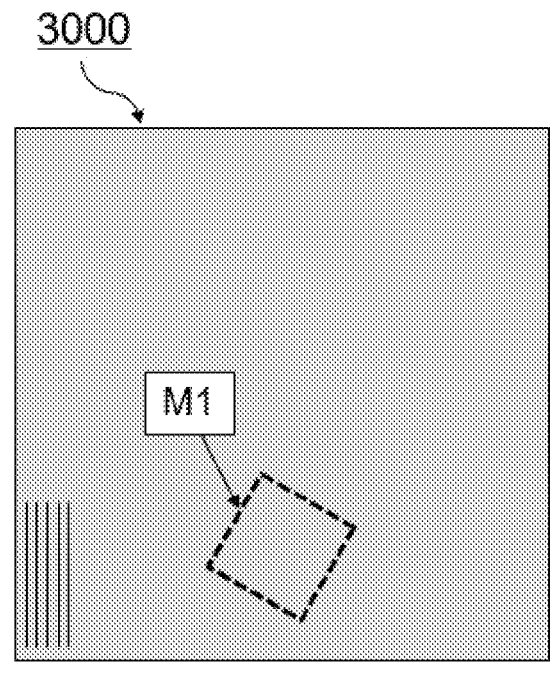
FIG. 18 is a top view of a panel of a CFRP.

From a molded CFRP panel 3000, the top view of which is illustrated in FIG. 18, such a sample approximately 20 mm×20 mm as illustrated by the dashed line M1 was cut out to obtain a sample for observation. The sample for observation was a sample cut out along the dashed line M1 in the 30° or 120° direction, assuming that the fiber direction of the outermost Layer of the CFRP panel was the 0° direction. The sample was embedded in an epoxy resin, and cured, and then, the edge portion was polished. This polished face was observed under a digital microscope VHX-5000 manufactured by Keyence Corporation. The magnification was basically set at 500 times.

(6) Image Analysis of Cross Section of CFRP

A. Method of Calculating Vcf

The rightward direction on the page was defined as the positive X-axis direction, and the upward direction was defined as the positive Z-axis direction. The sample for observation was set in such a manner that the thickness direction of the CFRP was identical to the Z-axis direction. A linkage image was produced in the Z-axis direction at 500 magnifications in such a manner that any Layer fitted in one image. When this was done, part of each of the upper and lower adjacent Layers was included. An example of the linkage image is illustrated in FIG. 2 or FIG. 10. The origin of the Z axis was set at the lower end of the cross-sectional photograph.

First, the Z-direction distribution of the Vcf was determined. Using ImageJ, the linkage image was binarized (FIG. 3 or FIG. 11), and the CFs (black) and a matrix resin (white) were distinguished. A Vcf was calculated from the areal ratio of the black portion. In the calculation of the Vcf, a rectangular region was used as a region of evaluation of the Vcf, the region having a length of 0.2 μm in the Z direction and a length equal to the whole X axis in the X direction in the image. In the Z-axis direction from the origin of the Z-axis, a Vcf in the region of evaluation was calculated for every 0.2 μm interval, so that the Z-direction distribution of the Vcf was obtained.

B. Method of Calculating Thickness of Inter-Layer Resin Layer Adjoining to Adjacent Layer The median in the Z-direction distribution of the Vcf acquired in section (6) A was regarded as the representative value of the Vcf. A portion adjoining to an adjacent Layer, and having a Vcf 0.5 times or less as large as the representative value was defined as an inter-Layer resin layer. The thickness of the inter-Layer resin layer was defined by the Z-direction length of the portion corresponding to the inter-Layer resin layer. In this regard, the Z coordinate of the boundary between the Layers was defined as the middle of the portion corresponding to the inter-Layer resin layer in the Z coordinate. In a case where a portion having a Vcf 0.5 times or less as large as the representative value did not exist in adjacency to the adjacent Layer, the inter-Layer resin layer was regarded as not existing, and the thickness of the inter-Layer resin layer was regarded as 0. In this case, the Z coordinate of the boundary between the Layers was defined as the Z coordinate of the point at which the Vcf value was the lowest in the vicinity between the Layers.

C. Method of Evaluating Whole Layer

Using the Z coordinates acquired in section (6) B for the boundaries with the upper and lower adjacent Layers, the Z-direction distribution of the Vcf of one Layer determined by excluding the upper and lower adjacent Layers was extracted. The average Vcf of the Layer extracted was defined as the average of the Z-direction distribution of the Vcf of the one Layer. The thickness of the Layer was defined as a difference in the Z coordinate between the boundaries with the upper and lower Layers.

D. Method of Evaluating Low-Vcf Sublayer

The Z-direction distribution of the Vcf of the one Layer, acquired in section (6) C, was used. In the Layer having high-Vcf Sublayers as both outermost layers, a portion having a Vcf the ratio of which to the average Vcf of the Layer was less than 0.5 was regarded as a low-Vcf Sublayer, except the inter-Layer resin layer at the upper and lower ends of the Layer.

E. Method of Evaluating High-Vcf Sublayer

The Z-direction distribution of the Vcf of one Layer, acquired in section (6) C, was used. A portion having a Vcf the ratio of which to the average Vcf of the Layer was 0.5 or more was regarded as a high-Vcf Sublayer.

In a case where three or more high-Vcf Sublayers existed in one Layer, the average Vcf of each high-Vcf Sublayer was calculated, and whether the average Vcfs of the high-Vcf Sublayers existing as both outermost parts of the Layer were the highest and the second highest in all the high-Vcf Sublayers existing in the Layer was determined.

F. Method of Calculating Resin Content of CFRP

From the Vcf calculated in A above and the thickness of each Layer in the CFRP, the resin content of the CFRP was calculated.

G. Method of Calculating Void Ratio

The rightward direction on the page was defined as the positive X-axis direction, the upward direction was defined as the positive Z-axis direction, and the sample for observation was set in such a manner that the thickness direction of the CFRP was identical to the Z-axis direction. A linkage image was produced in the Z-axis direction at 500 magnifications in such a manner that the whole thickness-direction region of the CFRP fitted in one image.

First, using ImageJ, the linkage image was trimmed to obtain only the region of the CFRP (FIG. 23). Next, the image trimmed using ImageJ was binarized (FIG. 24), and the void (black) and the other portion (white) were distinguished. The void ratio was calculated from the areal ratio of the black portion to the whole trimmed image.

(7) Electroconductivity of CFRP in Thickness Direction

From a molded CFRP panel, a sample 40 mm×40 mm was cut out along the 0° and 90° directions. Both faces of the sample were polished and removed by approximately 50 μm. Then, both faces were uniformly coated with Ag paste, using a spatula. The paste was cured for one hour in a hot-air oven adjusted to a temperature of 120° C. A sample for evaluation of the electroconductivity was thus obtained. The resistance of the resulting sample in the thickness direction was measured by a four-terminal method under the current-load conditions at a direct current of 5 mA, using an impedance analyzer (IM3570, manufactured by Hioki E.E. Corporation). The electroconductivity (S/m) was calculated from the resistance value measured and the dimensions of the sample.

(8) Electric Potential Difference and Electroconductivity of CFRP in In-Plane Longitudinal Direction From a molded CFRP panel, a sample 50 mm×5 mm was cut out along the 45° direction as the longitudinal direction and along the −45° direction as the cross direction. Both end faces having a width of 5 mm were uniformly coated with Ag paste, using a spatula. The paste was cured for one hour in a hot-air oven adjusted to a temperature of 120° C. A sample for the evaluation of the electroconductivity was thus obtained. The electric potential difference and resistance of the resulting sample in the longitudinal direction (45° direction) was measured by a four-terminal method under the current-load conditions at a direct current of 5 mA, using an impedance analyzer (IM3570, manufactured by Hioki E.E. Corporation). The electroconductivity (S/m) in the longitudinal direction was calculated from the resistance value measured and the dimensions of the sample.

(9) Eddy Current Flaw Detection (Evaluation of Induced Current)

The series resistance component of a copper-made coil (the inner diameter, 10 mm; the outer diameter, 14 mm; the height, 3 mm; the number of windings, 60; with a PPS bobbin (the flange thickness, 1 mm); manufactured by Kitamoto Electric Works Co., Ltd.) was measured by a four-terminal method under the current-load conditions at an alternating current of 5 mA and a frequency of 300 kHz, using an impedance analyzer (IM3570, manufactured by Hioki E.E. Corporation). The first measurement was made with no electrical conductor placed near the coil. If any electrical conductor was placed near the coil, the series resistance component of the coil would vary, and thus, no electrical conductor was placed in the range that affected the series resistance component. Next, the coil was placed so as to be in contact with the molded CFRP panel, and the series resistance component of the coil was measured by the same technique. When this was done, there was a distance of 1 mm between the coil portion and the CFRP panel because the coil had a PPS bobbin. The resistance variation of the coil was calculated by subtracting the result of the first measurement from the series resistance component measured when the coil was placed on the CFRP panel.

<Thermosetting CFRP Having Vcf of Approximately 60%>

Examples 1 to 7 and Comparative Examples 1 to 4

In Examples 1 to 4, each secondary resin was made as shown in Table 1 and Table 2. The CFRP-A (all Layers of which were "specific Layers") was used, and the thickness of the low-Vcf Sublayer was varied. Examples 5 and 6 were in the forms of the CFRP-B and -C respectively, in which the "specific Layer" existed only as the second Layer and only as the fourth Layer respectively. In Example 7, the CFRP-D was used. Here, all the Layers were "specific Layers", and the low-Vcf Sublayer was formed of glass fiber woven fabric.

In Comparative Examples 1 to 2, the CFRP-E was produced. This contained no "specific Layer", and had a resin-rich layer between Layers. In Comparative Example 3, the CFRP-F was used (all Layers of which were ordinary Layers). In Comparative Example 4, the CFRP-G was used. This contained a low-Vcf Sublayer, but the inter-Layer resin layer was thick. The evaluation results are listed in Table 2. In the Comparative Examples that contained no "specific Layer", an arbitrary Layer was used for image analysis (hereinafter, the same applies).

Figure 19:
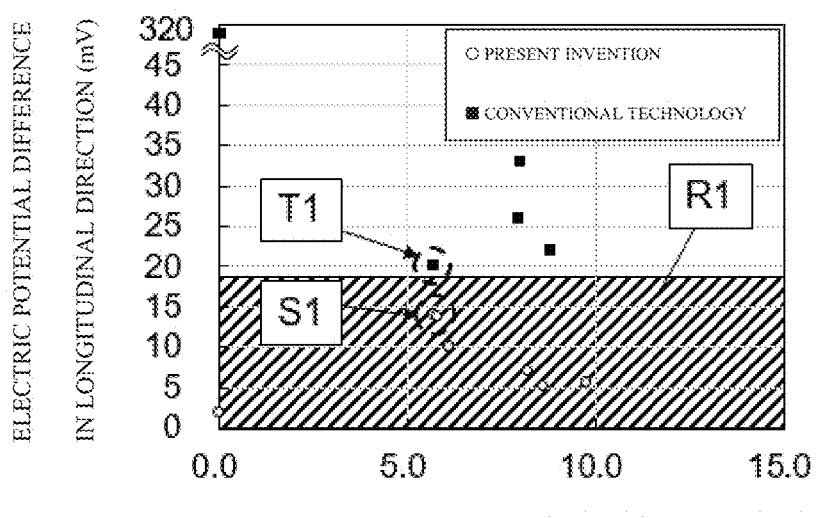
FIG. 19 is a graph illustrating the results of evaluation in Examples of the first invention.

First, to verify the effect for inhibiting edge glow, a graph is shown in FIG. 19, in which the electroconductivity of the CFRP in the thickness direction is taken as the abscissa, and the electric potential difference in the longitudinal direction is taken as the ordinate. The Comparative Examples according to a conventional technology indicated that, as the electroconductivity in the thickness direction increased, the electric potential difference in the longitudinal direction tended to decrease, but the present invention has revealed that the electric potential difference in the longitudinal direction was controlled at less than 20 mV (the region denoted by R1), regardless of the electroconductivity in the thickness direction. Among others, Example 7, which was performed using the CFRP-D having electroconductivity at 0 in the thickness direction, exhibited the lowest electric potential difference in the longitudinal direction, and was revealed to have a high effect for inhibiting edge glow. The CFRP-B or -C (Example 5 or 6) denoted by S1 was the same as the CFRP-F (Comparative Example 3) illustrated by T1 except that only one Layer was replaced with a "specific Layer". However, even the CFRP-B or -C was revealed to have a large effect for decreasing the electric potential difference in the longitudinal direction.

Figure 20:
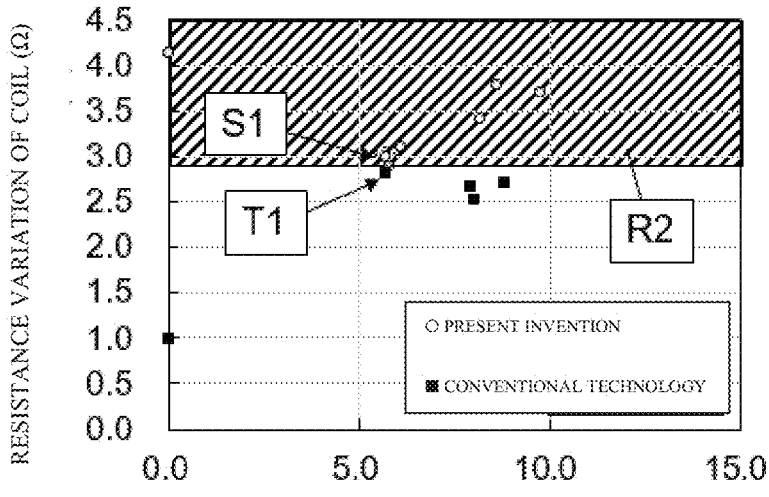
FIG. 20 is a graph illustrating the results of evaluation in Examples of the first invention.

Next, to verify the effect for enhancing the induction heating temperature, a graph is shown in FIG. 20, in which the electroconductivity of the CFRP in the thickness direction is taken as the abscissa, and the resistance variation of the coil in the eddy current flaw detection is taken as the ordinate. With a CFRP according to the present invention, the resistance variation of the coil was larger than 2.8Ω (the region denoted by R2), regardless of the electroconductivity in the thickness direction. The CFRP exhibited a larger amount of induced current and furthermore the effect for enhancing the induction heating temperature. Among others, Example 7, which was performed using the CFRP-D having electroconductivity at 0 in the thickness direction, exhibited the largest resistance variation of the coil, and was revealed to have a high effect for enhancing the induction heating temperature. In addition, in the comparison between Examples 5 and 6 denoted by S1, Example 5 had a slightly higher resistance variation of the coil. This has revealed that disposing a "specific Layer" as the second Layer from the outermost part of a CFRP had a higher effect for enhancing the induction heating temperature than disposing a "specific Layer" as the fourth Layer.

Figure 21:
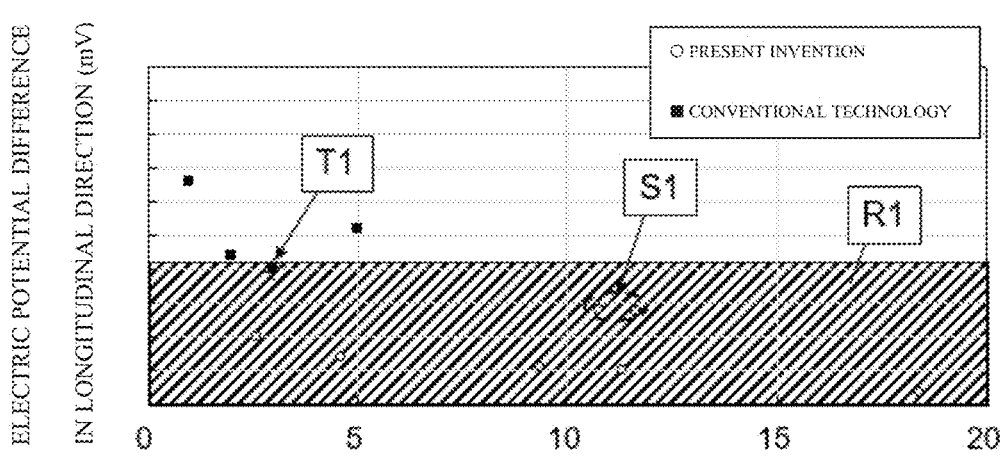
FIG. 21 is a graph illustrating the results of evaluation in Examples of the first invention.

To study a more preferable form of the present invention, a graph is shown in FIG. 21, in which (the thickness of the low-Vcf Sublayer)/(the thickness of the Layer) is taken as the abscissa, and the electric potential difference in the longitudinal direction is taken as the ordinate. In the present invention, the CFRPs (other than the examples denoted by S1) in which all the Layers were "specific Layers" exhibited a stronger tendency for the electric potential difference in the longitudinal direction to decrease, in a case where (the thickness of the low-Vcf Sublayer)/(the thickness of the Layer) was higher. This has revealed that the larger the ratio of the thickness of the low-Vcf Sublayer, the higher the effects of the present invention. In this regard, it is conceivable that, because Examples 5 and 6 illustrated by S1 had only one Layer as a "specific Layer" in the CFRP, the effect of the Examples fell short of the effect of the other Examples in which all the Layers were "specific Layers".

The above-described results have revealed that the present invention provided a larger effect for inhibiting edge glow and in enhancing the induction heating temperature than a conventional technology, among the CFRPs having the same fiber areal weight and substantially the same resin content. In particular, Example 7 including no electroconductive particles provide the highest effects, hence revealing that the present invention affords these effects without using expensive electroconductive particles.

In Comparative Example 3, both faces of the secondary prepreg were resin-rich, but after molding, the CFRP-F contained almost no low-Vcf Sublayer or inter-Layer resin layer. It is inferred that this is because the CFs moved during molding, and the Vcf was uniformized throughout the whole Layer. This suggests that, to form a low-Vcf Sublayer in a CFRP, it is effective to dispose a spacer such as polymer particles or a glass fiber woven fabric, as in Examples 1 to 7.

<Thermosetting CFRP Having Vcf of Approximately 50%>

Example 8 and Comparative Example 5

In Example 8, the CFRP-H was used. In this CFRP, all the Layers were "specific Layers", and the average Vcf of the whole Layer was lower than in Example 1. In Comparative Example 5, the CFRP-I was produced. This CFRP-I contained no "specific Layer", and the average Vcf of the whole Layer was lower than in Comparative Example 1. The evaluation results are listed in Table 3.

The electric potential difference of the CFRP in the in-plane longitudinal direction was overwhelmingly lower in Example 8, and was less than 100 mV. The resistance variation of the coil was larger in Example 8. The above-described results have revealed that, even in a case where the average Vcf of the whole Layer was low at 50%, the present invention provided a larger effect for inhibiting edge glow and in enhancing the induction heating temperature than a conventional technology, among the CFRPs having the same fiber areal weight and the same resin content. In Example 8, the electric potential difference of the CFRP in the in-plane longitudinal direction was not as low, and the value of the resistance variation of the coil was not as large, as in Example 1 in which the average Vcf was higher at approximately 63%.

<Thermoplastic CFRP Having Vcf of Approximately 50%>

Examples 9 to 11 and Comparative Example 6

In Example 9, the CFRP-J was used. All the Layers thereof were "specific Layers". In Comparative Example 6, the CFRP-K was used. This contained no "specific Layer", and had a resin-rich layer between Layers. In Example 10, the CFRP-L was used. In this CFRP, all the Layers were "specific Layers", and in the "specific Layers", the average Vcfs of the high-Vcf Sublayers as both outermost parts were the highest and the second highest. In Example 11, the CFRP-M was used. In this form, all the Layers were "specific Layers". In addition, the high-Vcf Sublayer having the lowest average Vcf in the high-Vcf Sublayers in the "specific Layer" was disposed as one outermost part of the "specific Layer". The evaluation results are listed in Table 4.

Comparison between Example 9 and Comparative Example 6 that had the same fiber areal weight and the same resin content has revealed that, in Example 9, the electric potential difference in the in-plane longitudinal direction was overwhelmingly lower, and the resistance variation of the coil was larger. The above-described results have revealed that, also in the thermoplastic CFRPs, the present invention provided a larger effect for inhibiting edge glow and in enhancing the induction heating temperature than a conventional technology.

Comparison between Examples 10 and 11 that had the same fiber areal weight and the same resin content has revealed that, in Example 10, the electric potential difference in the longitudinal direction was lower, and the resistance variation of the coil was larger. The above-described results have revealed that, in a case where the high-Vcf Sublayers as both outermost parts had the highest and the second highest average Vcf respectively in a "specific Layer", the CFRP had a larger effect for inhibiting edge glow and in enhancing the induction heating temperature. In this regard, Examples 10 and 11 were different in the fiber areal weight and the resin content from Comparative Example 6, and hence, were difficult to simply compare, but had a smaller electric potential difference in the longitudinal direction and a larger resistance variation of the coil than Comparative Example 7.

<Supplement to Examples Performed Using Electroconductive Particles>

Examples 12 to 14 and Comparative Examples 7 and 8

In Example 12, the CFRP-G was produced in the same manner as in Comparative Example 4 except that Resin-F was used as the secondary resin composition. Electroconductive particles were disposed in the inter-Layer resin layer, and thus, a high value was obtained as the electroconductivity of the CFRP in the thickness direction, as shown in Table 5. However, the inter-Layer resin layer was thick, and thus, the resistance variation of the coil became small, allowing the prediction that the induction heating effect would fell short of such an effect as in Examples 1 to 7.

In Examples 13 and 14, the secondary resin and the tertiary resin had the compositions of Resin-A2 and Resin-B2 respectively in Table 1, and the CFRP-N was produced as a form of the present invention. In this CFRP-N, all the Layers were "specific Layers", and the amount of electroconductive particles between the Layers was varied. In Comparative Examples 7 and 8, the secondary resin and the tertiary resin had the compositions of Resin-A2 and Resin-B2 respectively in Table 1, and the CFRP-O was produced. This contained no "specific Layer", and is not a CFRP according to the present invention. The amount of electroconductive particles between the Layers was the same between Example 13 and Comparative Example 7, and the same between Example 14 and Comparative Example 8. The evaluation results are listed in Table 5. In the Comparative Examples that contained no "specific Layer", an arbitrary Layer was used for image analysis.

First, to verify the effect for inhibiting edge glow, a graph is shown in FIG. 24, in which the electroconductivity of the CFRP in the thickness direction is taken as the abscissa, and the electric potential difference in the longitudinal direction is taken as the ordinate. A conventional technology indicated that, as the amount of electroconductive particles was increased to increase the electroconductivity in the thickness direction, the electric potential difference in the longitudinal direction tended to decrease. However, the present invention has revealed that the electric potential difference in the longitudinal direction was controlled at less than 13 mV (the region denoted by R4), although the electroconductivity in the thickness direction was 0. It has been verified that in Example 13 in which the amount of electroconductive particles was small, the electric potential difference in the longitudinal direction was smaller than in Comparative Example 7 in which the amount of electroconductive particles was large. The present invention has revealed that the effect for decreasing the electric potential difference in the longitudinal direction was large even if the amount of electroconductive particles was small.

Figures 25, 26:
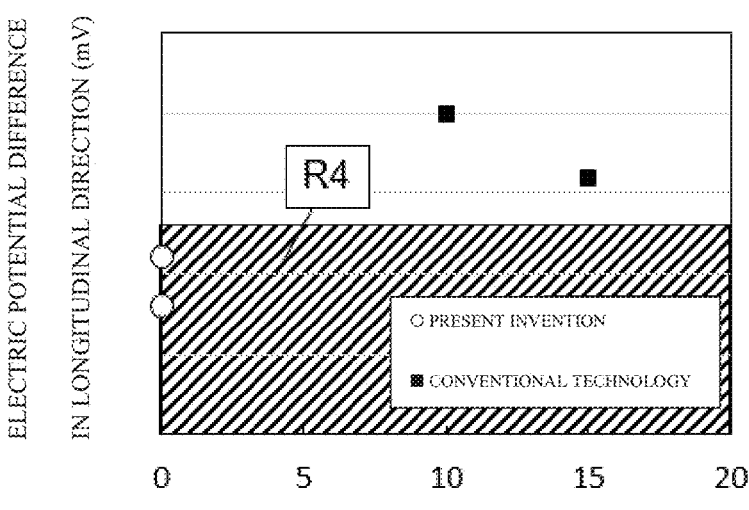
FIG. 25 is a graph illustrating the results of evaluation in Examples of the present invention.
FIG. 26 is a graph illustrating the results of evaluation in Examples of the present invention.

Next, to verify the effect for enhancing the induction heating temperature, a graph is shown in FIG. 25, in which the electroconductivity of the CFRP in the thickness direction is taken as the abscissa, and the resistance variation of the coil in the eddy current flaw detection is taken as the ordinate. According to the present invention, the resistance variation of the coil was 3.2Ω or more (a region denoted by R5), even if the electroconductivity in the thickness direction was 0. The CFRP exhibited a larger amount of induced current and furthermore the effect for enhancing the induction heating temperature.

<Supplement to Examples with Low-Vcf Layer Containing Air-Permeable Sheet>

Examples 15 to 16, Reference Example 1, and Comparative Example 9

In these examples, a 1.5-ary prepreg was produced in accordance with (2) B above. However, the resin areal weight of the secondary resin film was 68 g/m². In addition, the laminates P, Q, and R were produced as below-mentioned.

Laminate P:

A primary prepreg produced so as to be in the structural form of the prepreg described in Table 6 and a glass fiber woven fabric (the glass fiber diameter, approximately 6 μm; a sheet having four layers of satin weaves) were cut to 100 mm×100 mm. Two cut sheets of the primary prepreg and the glass fiber woven fabric were assumed as one set. In each set, the two sheets of the primary prepreg were made to have an angle of fiber orientation in the same direction, and one glass fiber woven fabric was sandwiched between the two sheets of the primary prepreg. A laminate was thus produced. Each set was a specific laminate set. Eight such specific laminate sets were provided. For each specific laminate set, the CF areal weight and the CF mass content were as described in Table 6. A total of eight specific laminate sets were laminated to produce a perpendicularly intersecting prepreg laminate (laminate P).

Laminate Q:

A primary prepreg produced to have a resin mass content of 20% and the glass fiber woven fabric prepreg produced were cut to 100 mm×100 mm. Then, a laminate Q was produced by the same procedures as the laminate P.

Laminate R:

As above-described, 1.5-ary prepreg was produced and cut to 100 mm×100 mm. Two cut sheets of the 1.5-ary prepreg were assumed as one set. The sheets of the 1.5-ary prepreg in each set were made to have the same angle of fiber orientation, and were laminated in such a manner that the face of one sheet was opposed to the face of the other, the faces being the ones not provided with the secondary resin film. Then, a laminate R was produced by the same procedures as the laminate P.

In each of Examples 15 and 16, the resin mass content of the primary prepreg was varied as shown in Table 6 to produce the laminate P, which was molded in the form of the CFRP-P.

In Reference Example 1, the laminate Q was produced and molded in the form of the CFRP-Q. In Comparative Example 9, the laminate R was produced, and made into the form of the CFRP-R, which contained no "specific Layer", and had a resin-rich layer between the Layers.

In each of Examples 15 and 16, the void ratio was 1.0% or less. In Example 16, the CF mass content was higher than in Example 15, and a slight void was recognized. The present invention has revealed that, although the electroconductivity of the CFRP in the thickness direction was 0 S/m, the electric potential difference in the longitudinal direction was 1.6 mV or less, and the effect for inhibiting edge glow was high. It has been verified that, particularly in Example 16, the average Vcf of the high-Vcf Sublayer was high at 73%, and the effect for inhibiting edge glow was higher than in Example 15. In the present invention, the resistance variation of the coil was 4.3Ω or more in any of the CFRPs, exhibiting a larger amount of induced current and furthermore the effect for enhancing the induction heating temperature. The effect for enhancing the induction heating temperature was revealed to be higher in Example 16 in which the average Vcf of the high-Vcf Sublayer was higher. In each of Example 15 and 16, the value of the Vcf of each of the high-Vcf Sublayers as both outermost parts of the "specific Layer" was 69% or more.

In Reference Example 1, the CF mass content was the same as in Example 15, but the void ratio was very high at 3.1%. A large number of void spaces were observed particularly in a portion where the CFs were dense. It has been revealed that, according to the present invention typified by Examples 15 and 16, the effect for decreasing the void ratio of the CFRP after molding was obtained by the following: the resin mass content of the primary prepreg was increased during the production of the laminate, and a glass fiber woven fabric not impregnated with a resin was disposed as a low-Vcf Sublayer. In Reference Example 1, the void ratio was high, and hence, the other evaluations were not performed.

In Comparative Example 9, the number of void spaces was small. In Comparative Example 9, the CF mass content was the same as in Example 16. However, the electric potential difference in the longitudinal direction was overwhelmingly higher, and the resistance variation of the coil was overwhelming lower. In the present invention typified by Examples 15 and 16, the effect for inhibiting edge glow and the effect for enhancing the induction heating temperature have been revealed to be higher than in a conventional technology.

TABLE 1

| | | Primary Resin Composition | Secondary Resin Composition | | | | | | | | Tertiary Resin Composition |
|---|---|---|---|---|---|---|---|---|---|---|---|
| | | Resin-1 | Resin-A | Resin-B | Resin-C | Resin-D | Resin-E | Resin-F | Resin-A2 | Resin-B2 | Resin-3 |
| Epoxy Resin | ELM434 | 55 | | | 55 | | | | | 55 | 55 |
| | EPICLON830 | 20 | | | 20 | | | | | 20 | 20 |
| | A-204E | 25 | | | 25 | | | | | 25 | 25 |
| Thermoplastic Resin | 5003P | 12.2 | | | 25.7 | | | | | 25.7 | 12.2 |
| Polymer Particles | Spherical Polyamide 6 | — | 23.1 | 14.7 | 7.3 | 3.6 | 37.2 | | 13.4 | 14.2 | 17 |

TABLE 1-continued

| | | Primary Resin Composition | Secondary Resin Composition | | | | | | | | Tertiary Resin Composition |
|---|---|---|---|---|---|---|---|---|---|---|---|
| | | Resin-1 | Resin-A | Resin-B | Resin-C | Resin-D | Resin-E | Resin-F | Resin-A2 | Resin-B2 | Resin-3 |
| Electroconductive Particles | ICB | — | 3.2 | 3 | 3 | 3 | — | 3.4 | 10.7 | 22 | — |
| Curing Agent | 4,4'-DDS | 40.3 | | | 40.3 | | | | 40.3 | | 40.3 |

TABLE 2

| | | | Example 1 | Example 2 | Example 3 | Example 4 | Example 5 | Example 6 |
|---|---|---|---|---|---|---|---|---|
| Structure of Prepreg | Primary Resin Composition | — | | | Resin-1 | | | |
| | Secondary Resin Composition | — | Resin-A | Resin-B | Resin-C | Resin-D | Resin-A | |
| | Carbon Fiber Areal Weight (Prepreg Sets as One Unit) | g/m² | | | 536 | | | |
| | Resin Mass Content (Prepreg Sets as One Unit) | % | | | 34 | | | |
| Structure of CFRP | Structure of Laminate (Prepreg Sets as One Unit) | — | | | $[0/90]_{2S}$ | | | |
| | Form of CFRP | — | | CFRP-A | | | CFRP-B | CFRP-C |
| | Average Vcf — Layer | % | 63 | 59 | 60 | 61 | 63 | 62 |
| | Low-Vcf Sublayer | % | 17 | 13 | 18 | 21 | 19 | 18 |
| | High-Vcf Sublayer | % | 69 | 64 | 62 | 62 | 68 | 68 |
| | Thickness — Layer | μm | 499 | 505 | 501 | 502 | 503 | 499 |
| | Low-Vcf Sublayer | μm | 56 | 47 | 23 | 13 | 54 | 58 |
| | Thickness of Inter-Layer resin layer | μm | 0 | 2 | 3 | 3 | 0 | 0 |
| | Portion corresponding to "Specific Layer" | — | | Whole Layer | | | Second Layer | Fourth Layer |
| | (Thickness of Low-Vcf Sublayer)/(Thickness of Layer) | % | 11 | 9 | 5 | 3 | 11 | 12 |
| Evaluation of Electroconductivity of CFRP | Electroconductivity in Thickness Direction | S/m | 8.6 | 9.8 | 8.2 | 6.1 | 5.7 | 5.8 |
| | Electroconductivity in In-plane Longitudinal Direction | S/m | $2.4 \times 10^3$ | $2.2 \times 10^3$ | $1.8 \times 10^3$ | $1.2 \times 10^3$ | $1.1 \times 10^3$ | $1.0 \times 10^3$ |
| | Electric Potential Difference in In-plane Longitudinal Direction | mV | 5 | 6 | 7 | 10 | 14 | 14 |
| | Resistance Variation of Coil (Eddy Current Flaw Detection) | Ω | 3.8 | 3.7 | 3.4 | 3.1 | 3.0 | 2.9 |

| | | | Example 7 | Comparative Example 1 | Comparative Example 2 | Comparative Example 3 | Comparative Example 4 |
|---|---|---|---|---|---|---|---|
| Structure of Prepreg | Primary Resin Composition | — | | | Resin-1 | | |
| | Secondary Resin Composition | — | — | Resin-A | Resin-B | Resin-1 | Resin-E |
| | Carbon Fiber Areal Weight (Prepreg Sets as One Unit) | g/m² | | | 536 | | |
| | Resin Mass Content (Prepreg Sets as One Unit) | % | 36 | | 34 | | |
| Structure of CFRP | Structure of Laminate (Prepreg Sets as One Unit) | — | | | $[0/90]_{2S}$ | | |
| | Form of CFRP | — | CFRP-D | CFRP-E | CFRP-F | | CFRP-G |
| | Average Vcf — Layer | % | 58 | 59 | 62 | 61 | 60 |
| | Low-Vcf Sublayer | % | 2 | — | — | — | 11 |
| | High-Vcf Sublayer | % | 70 | 66 | 67 | 61 | 66 |
| | Thickness — Layer | μm | 500 | 488 | 494 | 495 | 502 |
| | Low-Vcf Sublayer | μm | 92 | — | — | — | 29 |
| | Thickness of Inter-Layer resin layer | μm | 0 | 60 | 47 | 2 | 31 |
| | Portion corresponding to "Specific Layer" | — | Whole Layer | | — | | Whole Layer |
| | (Thickness of Low-Vcf Sublayer)/(Thickness of Layer) | % | 18 | — | — | — | 6 |
| Evaluation of Electroconductivity of CFRP | Electroconductivity in Thickness Direction | S/m | 0.0 | 8.0 | 8.8 | 5.7 | 0.0 |
| | Electroconductivity in In-plane Longitudinal Direction | S/m | $6.7 \times 10^3$ | $3.7 \times 10^2$ | $5.6 \times 10^2$ | $8.3 \times 10^2$ | $3.7 \times 10$ |
| | Electric Potential Difference in In-plane Longitudinal Direction | mV | 2 | 33 | 22 | 20 | 320 |
| | Resistance Variation of Coil (Eddy Current Flaw Detection) | Ω | 4.1 | 2.5 | 2.7 | 2.8 | 1.0 |

TABLE 3

| | | | Example 1 | Example 8 | Comparative Example 5 |
|---|---|---|---|---|---|
| Structure of Prepreg | Primary Resin Composition | — | | Resin-1 | |
| | Secondary Resin Composition | — | | Resin-A | |
| | Carbon Fiber Areal Weight (Prepreg Sets as One Unit) | g/m² | | 536 | |
| | Resin Mass Content (Prepreg Sets as One Unit) | % | 34 | | 40 |
| Structure of CFRP | Structure of Laminate (Prepreg Sets as One Unit) | — | | $[0/90]_{2S}$ | |
| | Form of CFRP | — | CFRP-A | CFRP-H | CFRP-I |
| | Average Vcf — Layer | % | 63 | 50 | 51 |
| | Low-Vcf Sublayer | % | 17 | 13 | — |
| | High-Vcf Sublayer | % | 69 | 54 | 55 |
| | Thickness — Layer | μm | 499 | 587 | 581 |
| | Low-Vcf Sublayer | μm | 56 | 58 | — |
| | Thickness of Inter-Layer resin layer | μm | 0 | 4 | 61 |
| | Portion corresponding to "Specific Layer" | — | | Whole Layer | — |
| | (Thickness of Low-Vcf Sublayer)/(Thickness of Layer) | % | 11 | 10 | — |
| Evaluation of Electro-conductivity of CFRP | Electroconductivity in Thickness Direction | S/m | 8.6 | 0.9 | 0.8 |
| | Electroconductivity in In-plane Longitudinal Direction | S/m | $2.4 \times 10^3$ | $2.2 \times 10^2$ | $5.3 \times 10$ |
| | Electric Potential Difference in In-plane Longitudinal Direction | mV | 5 | 51 | 210 |
| | Resistance Variation of Coil (Eddy Current Flaw Detection) | Ω | 3.8 | 1.9 | 1.1 |

TABLE 4

| | | | Example 9 | Comparative Example 6 | Example 10 | Example 11 |
|---|---|---|---|---|---|---|
| Structure of Prepreg | Resin | — | | TC1000 | | |
| | Carbon Fiber Areal Weight (Prepreg Sets as One Unit) | g/m² | | 568 | | 852 |
| | Resin Mass Content (Prepreg Sets as One Unit) | % | | 38 | | 39 |
| Structure of CFRP | Structure of Laminate (Prepreg Sets as One Unit) | — | | $[0/90]_{2S}$ | | |
| | Form of CFRP | — | CFRP-J | CFRP-K | CFRP-L | CFRP-M |
| | Average Vcf — Layer | % | 53 | 53 | 52 | 53 |
| | Low-Vcf Sublayer | % | 9 | — | 11 | 13 |
| | High-Vcf Sublayer | % | 59 | 58 | 57 | 57 |
| | Thickness — Layer | μm | 593 | 501 | 852 | 931 |
| | Low-Vcf Sublayer | μm | 68 | — | 99 | 91 |
| | Thickness of Inter-Layer resin layer | μm | 3 | 58 | 2 | 3 |
| | Portion corresponding to "Specific Layer" | — | Whole Layer | — | Whole Layer | |
| | (Thickness of Low-Vcf Sublayer)/(Thickness of Layer) | % | 11 | — | 12 | 10 |
| Evaluation of Electro-conductivity of CFRP | Electroconductivity in Thickness Direction | S/m | 0.0 | 0.0 | 0.0 | 0.0 |
| | Electroconductivity in In-plane Longitudinal Direction | S/m | $1.4 \times 10^2$ | $1.2 \times 10$ | $1.2 \times 10^2$ | $1.0 \times 10^2$ |
| | Electric Potential Difference in In-plane Longitudinal Direction | mV | 76 | 880 | 59 | 64 |
| | Resistance Variation of Coil (Eddy Current Flaw Detection) | Ω | 0.32 | 0.08 | 0.29 | 0.24 |

TABLE 5

| | | | | Example 12 | Example 13 | Example 14 | Comparative Example 7 | Comparative Example 8 |
|---|---|---|---|---|---|---|---|---|
| Structure of Prepreg | Fiber Areal Weight | Primary Prepreg | g/m² | 268 | | 268 | | |
| | Resin Areal Weight | | g/m² | — | 68 | | 96 | |
| | Resin Areal Weight | Second Resin | g/m² | — | | 40 | | |
| | Resin Areal Weight | Third Resin | g/m² | — | 28 | | — | |
| | Electroconductive Particles Areal Weight (Prepreg Sets as One Unit) | | g/m² | — | 4.5 | 8.7 | 4.5 | 8.7 |
| | Fiber Areal Weight (Prepreg Sets as One Unit) | | g/m² | 536 | | 536 | | |
| | Resin Mass Content (Prepreg Sets as One Unit) | | % | 34 | | 34 | | |
| Structure of CFRP | Structure of Laminate (Prepreg Sets as One Unit) | | — | $[0/90]_{2S}$ | | $[0/90]_{2S}$ | | |
| | Form of CFRP | | — | CFRP-G | | CFRP-N | | CFRP-O |
| | Vcf | Layer | % | 57 | 61 | 59 | 59 | 63 |
| | | Low-Vcf Sublayer | % | 11 | 15 | 16 | | — |
| | | High-Vcf Sublayer | % | 63 | 71 | 70 | 67 | 68 |
| | Thickness | Whole Layer | μm | 510 | 500 | 491 | 488 | 499 |
| | | Low-Vcf Sublayer | μm | 31 | 27 | 25 | | — |
| | | Thickness of Inter-Layer resin layer | μm | 24 | — | — | — | — |
| | Portion corresponding to "Specific Layer" | | — | Whole Layer | Whole Layer | | | — |
| | (Thickness of Low-Vcf Sublayer)/(Thickness of Layer) | | % | 6 | 5.4 | 5.1 | — | 0 |

TABLE 5-continued

| | | | Example 12 | Example 13 | Example 14 | Comparative Example 7 | Comparative Example 8 |
|---|---|---|---|---|---|---|---|
| Evaluation of Electroconductivity of CFRP | Electroconductivity in Thickness Direction | S/m | 7.9 | 0 | 0 | 10 | 15 |
| | Electroconductivity in In-plane Longitudinal Direction | S/m | $4.7 \times 10^2$ | $9.4 \times 10^2$ | $1.3 \times 10^3$ | $5.1 \times 10^2$ | $6.3 \times 10^2$ |
| | Electric Potential Difference in In-plane Longitudinal Direction | mV | 26 | 11 | 8 | 20 | 16 |
| | Resistance Variation of Coil (Eddy Current Flaw Detection) | Ω | 2.7 | 3.2 | 3.5 | 2.8 | 3.0 |

TABLE 6

| | | | Example 15 | Example 16 | Reference Example 1 | Comparative Example 9 |
|---|---|---|---|---|---|---|
| Structure of Prepreg | CF Areal Weight of Primary Prepreg | g/m² | | 268 | | |
| | Resin Mass Content of Primary Prepreg | % | 26 | 24 | 20 | |
| | Areal Weight of Glass Fiber Woven Fabric | g/m² | | 104 | | 0 |
| | Resin Mass Content of Glass Fiber Woven Fabric | % | 0 | | 39 | 0 |
| | Areal Weight of Secondary Resin Film | g/m² | | 0 | | 68 |
| | CF Areal Weight of Laminate Sets as One Unit | g/m² | | 536 | | |
| | CF Mass Content of Laminate Sets as One Unit | % | 65 | 66 | 65 | 66 |
| Structure of Prepreg Laminate | Form of Prepreg Laminate | — | Laminate P | | Laminate Q | Laminate R |
| Structure of CFRP | Structure of Laminate (Prepreg Sets as One Unit) | — | $[0/90]_{2S}$ | | | |
| | Average Vcf — Layer | % | 59 | 61 | — | 59 |
| | Low-Vcf Sublayer | % | 4 | 3 | — | — |
| | High-Vcf Sublayer | % | 72 | 73 | — | 66 |
| | Thickness — Layer | μm | 491 | 482 | — | 488 |
| | Low-Vcf Sublayer | μm | 85 | 83 | — | — |
| | Thickness of Inter-Layer resin layer | μm | 0 | | — | 60 |
| | Portion corresponding to "Specific Layer" | — | Whole Layer | | — | — |
| | (Thickness of Low-Vcf Sublayer)/(Thickness of Layer) | % | 17 | 17 | — | — |
| Evaluation of Electroconductivity of CFRP | Electroconductivity in Thickness Direction | S/m | 0.0 | 0.0 | — | 8.0 |
| | Electroconductivity in In-plane Longitudinal Direction | S/m | $8.0 \times 10^3$ | $9.2 \times 10^3$ | — | $3.7 \times 10^2$ |
| | Electric Potential Difference in In-plane Longitudinal Direction | mV | 1.6 | 1.4 | — | 33 |
| | Resistance Variation of Coil (Eddy Current Flaw Detection) | Ω | 4.5 | 4.8 | — | 2.5 |
| Evaluation of Quality of CFRP | Void Ratio | % | 0 | 0.8 | 3.1 | 0 |

INDUSTRIAL APPLICABILITY

A CFRP according to the present invention can be widely used in fields that require lightning resistance and in fields that require induction welding. In particular, using the CFRP as a structural member for aircrafts can reduce a conventional lightning-resistant system such as a metal mesh or a sealant, thus can be suitably used in the art, and can simplify a conventional lightning-resistant system, and contribute to reducing the weight of, and cutting down on the cost of, an aircraft.

REFERENCE SIGNS LIST

1 Carbon fiber
2 Matrix resin with which carbon fiber layer is impregnated
20, 21, 22, 23, 24, 25 Inter-Layer resin layer adjacent to upper Layer
30, 31, 32, 33, 34, 35 Inter-Layer resin layer adjacent to lower Layer
100, 101, 102, 105 Layer (specific Layer) having the same angle of fiber orientation
103, 104 Layer having the same angle of fiber orientation
110, 111, 112, 115, 122, 210, 212, 222, 310 Low-Vcf Sublayer
150, 151, 152, 155, 160, 161, 162, 165, 172 High-Vcf Sublayer
200, 201, 202, 203, 204, 205 Adjacent upper Layer
300, 301, 302, 303, 304, 305 Adjacent lower Layer
401, 501 Lower Layer
600, 601, 602, 603, 604 Secondary resin
605, 607 Glass fiber woven fabric prepreg
611, 612 Tertiary resin
613 Electroconductive Particles
700, 705, 706, 707, 708 Primary prepreg
1000, 1001, 1002 One embodiment of CFRP according to the present invention
1003 One form of conventional ordinary CFRP
1004 One form of conventional interlaminar-reinforcement CFRP
1005 One form of conventional interlaminar-reinforcement CFRP
2000, 2001, 2002, 2003, 2004 1.5-ary prepreg in one form of intermediate base material
3000 Top view of CFRP panel
L1, L4 Layer observed in middle in Z-direction
L2, L5 Adjacent Layer observed on upper-side in Z-direction
L3, L6 Adjacent Layer observed on lower-side in Z-direction
W1 Length of whole region in X-axis direction A1, A1' Representative value (median) of Vcfs of whole three Layers B1, B1' Threshold of Vcf for defining inter-Layer resin layer C1, C1' Average Vcf of whole Layer D1, D1' Threshold of Vcf for defining low-Vcf Sublayer K1 Region corresponding to low-Vcf Sublayer I1, I1' Region corresponding toe inter-Layer resin layer adjacent to lower Layer J1 Point having lowest Vcf near boundary with upper adjacent Layer J1' Region corresponding toe inter-Layer resin layer adjacent to upper Layer Z3, Z6 Z coordinate at boundary between Layer and lower adjacent Layer Z2, Z5 Z coordinate at boundary between Layer and upper adjacent Layer M1 Cut portion of sample for cross-sectional observation T1 Results of conventional technology composed of ordinary Layer (Comparative Example 3)

S1 Result of present invention containing only one "specific Layer" (Examples 8 and 9)

R1 Region having desirable electric potential difference in-plane longitudinal direction R2 Region having desirable resistance variation of coil T110, T112, T115, T122 Thickness of low-Vcf Layer T20, T22, T24, T25 Thickness of inter-Layer resin layer adjacent to upper Layer T30, T32, T34, T35 Thickness of inter-Layer resin layer adjacent to lower Layer T100, T102, T104, T105 Thickness of Layer

The invention claimed is:

1. A carbon-fiber-reinforced composite material comprising carbon fiber sheets containing unidirectionally arranged carbon fibers, laminated multidirectionally one on another, and impregnated with a matrix resin, which is cured;

wherein, a region in which the carbon fibers have the same angle of fiber orientation consecutively in the thickness direction is defined as a Layer, and that, when said Layer is composed of a plurality of regions having a given thickness, and having different carbon fiber volume content factors (Vcfs), each of said regions having a given thickness is defined as a Sublayer, said carbon fiber sheet contains a Layer that satisfies (1) to (3) (such a Layer is referred to as a "specific Layer"), and the thickness of a resin portion between said specific Layer and at least one Layer adjacent to said specific Layer is 5 μm or less;

(1) the average Vcf of said Layer (hereinafter referred to as the Layer average Vcf) is 50% or more, (2) as both outermost parts of said Layer, Sublayers each having a Vcf the ratio of which to said Layer average Vcf is 0.5 or more (hereinafter, such a Sublayer is referred to as a high-Vcf Sublayer) are disposed, wherein each average Vcf of the high-Vcf Sublayer is higher than said Layer average Vcf, and (3) between said high-Vcf Sublayers as both outermost parts of said Layer, a Sublayer having a Vcf the ratio of which to said Layer average Vcf is less than 0.5 (hereinafter, such a Sublayer is referred to as a low-Vcf Sublayer) exists.

2. A carbon-fiber-reinforced composite material comprising carbon fiber sheets containing unidirectionally arranged carbon fibers, laminated multidirectionally one on another, and impregnated with a matrix resin, which is cured;

wherein, a region in which the carbon fibers have the same angle of fiber orientation consecutively in the thickness direction is defined as a Layer, and that, when said Layer is composed of a plurality of regions having a given thickness, and having different carbon fiber volume content factors (Vcfs), each of said regions having a given thickness is defined as a Sublayer, said carbon fiber sheet contains a Layer that satisfies (1) to (3) (such a Layer is referred to as a "specific Layer"), and a resin portion exists between said specific Layer and a Layer adjacent to said specific Layer, said resin portion containing electroconductive particles;

(1) the average Vcf of said Layer (hereinafter referred to as the Layer average Vcf) is 50% or more, (2) as both outermost parts of said Layer, Sublayers each having a Vcf the ratio of which to said Layer average Vcf is 0.5 or more (hereinafter, such a Sublayer is referred to as a high-Vcf Sublayer) are disposed, wherein each average Vcf of the high-Vcf Sublayer is higher than said Layer average Vcf, and (3) between said high-Vcf Sublayers as both outermost parts of said Layer, a Sublayer having a Vcf the ratio of which to said Layer average Vcf is less than 0.5 (hereinafter, such a Sublayer is referred to as a low-Vcf Sublayer) exists.

3. The carbon-fiber-reinforced composite material according to claim 1, wherein said Layer average Vcf is 80% or less.

4. The carbon-fiber-reinforced composite material according to claim 1, wherein each of said high-Vcf Sublayers disposed as both outermost parts of said specific Layer has the highest or the second highest average Vcf in said high-Vcf Sublayers existing in said specific Layer.

5. The carbon-fiber-reinforced composite material according to claim 1, wherein at least one said specific Layer is disposed as the first or the second in said Layers numbered from the upper face or lower face of said carbon-fiber-reinforced composite material.

6. The carbon-fiber-reinforced composite material according to claim 1, wherein the average Vcf of said low-Vcf Sublayer is 20% or less.

7. The carbon-fiber-reinforced composite material according to claim 1, wherein the ratio of the thickness of said low-Vcf Sublayer contained in said specific Layer to the thickness of said specific Layer is from 5% to 30%.

8. The carbon-fiber-reinforced composite material according to claim 1, wherein said low-Vcf Sublayer is an insulating layer.

9. The carbon-fiber-reinforced composite material according to claim 1, wherein the average Vcf of said high-Vcf Sublayers is 55% or more.

10. The carbon-fiber-reinforced composite material according to claim 1, wherein the average Vcf of said high-Vcf Sublayers is 71% or more.

11. The carbon-fiber-reinforced composite material according to claim 1, wherein the resin content of said specific Layer is from 30 to 40 mass %.

12. The carbon-fiber-reinforced composite material according to claim 1, wherein the thickness of said specific Layer is 350 μm or more.

13. The carbon-fiber-reinforced composite material according to claim 1, having a void ratio of 1.0% or less.

14. The carbon-fiber-reinforced composite material according to claim 1, wherein said low-Vcf Sublayer has an air-permeable sheet-like base material.

15. The carbon-fiber-reinforced composite material according to claim 14, wherein said air-permeable sheet-like base material is a woven or knitted fabric or a nonwoven fabric.

16. The carbon-fiber-reinforced composite material according to claim 1, wherein two or more layers of said specific Layers are consecutively laminated.

17. A structure composed of said carbon-fiber-reinforced composite material according to claim 1, wherein the shape of said structure is selected from a flat-plate-shaped structure, cylindrical structure, box-shaped structure, C-shaped structure, H-shaped structure, L-shaped structure, T-shaped structure, I-shaped structure, Z-shaped structure, and hat-shaped structure.

\* \* \* \* \*